(12) United States Patent
Urasawa

(10) Patent No.: US 10,055,109 B2
(45) Date of Patent: Aug. 21, 2018

(54) IMAGE FORMING SYSTEM, INFORMATION PROCESSING APPARATUS AND SETTING METHOD

(71) Applicant: Oki Data Corporation, Tokyo (JP)

(72) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 327 days.

(21) Appl. No.: 14/825,768

(22) Filed: Aug. 13, 2015

(65) Prior Publication Data

US 2016/0147426 A1    May 26, 2016

(30) Foreign Application Priority Data

Nov. 20, 2014 (JP) .................... 2014-235215

(51) Int. Cl.
  *G06F 3/048* (2013.01)
  *G06F 3/0484* (2013.01)
(52) U.S. Cl.
  CPC ...... *G06F 3/04847* (2013.01); *G06F 3/04842* (2013.01)
(58) Field of Classification Search
  None
  See application file for complete search history.

(56) References Cited

U.S. PATENT DOCUMENTS

| 2001/0026290 | A1* | 10/2001 | Machida | H04N 1/00411 715/810 |
| 2013/0198671 | A1* | 8/2013 | Kasai | G06F 3/0482 715/771 |
| 2014/0078535 | A1* | 3/2014 | Okada | H04N 1/00411 358/1.13 |
| 2014/0258913 | A1* | 9/2014 | Shibukawa | G06F 3/0488 715/778 |

FOREIGN PATENT DOCUMENTS

JP    2005-313413 A    11/2005

* cited by examiner

*Primary Examiner* — Henok A Shiferaw
(74) *Attorney, Agent, or Firm* — Muncy, Geissler, Olds & Lowe, P.C.

(57) ABSTRACT

An image forming system includes a first display input part that displays a first selection screen for selecting an item to perform a setting among a plurality of predetermined items for performing a setting for an image forming apparatus, and receives a setting for an item selected on the first selection screen, and a second display input part that displays a second selection screen for selecting an item to perform a setting among the predetermined items in which an already set item is eliminated, the already set item being defined as an item for which the setting has been performed, and receives a setting for an item selected on the second selection screen.

9 Claims, 25 Drawing Sheets

Fig. 23

| |
|---|
| Job Start Command |
| GET LANGUAGE_SETTING |
| GET TIME_SETTING |
| GET FAX_SETTING |
| GET NETWORK_SETTING |
| GET LANGUAGE |
| GET FAX_NUMBER |
| GET IP_ADDRESS |
| GET SUBNET_MASK |
| GET GATEWAY |
| Job End Command |

*Fig. 24*

| Job Start Command | |
|---|---|
| GET LANGUAGE_SETTING | = FALSE |
| GET TIME_SETTING | = TRUE |
| GET FAX_SETTING | = TRUE |
| GET NETWORK_SETTING | = FALSE |
| GET LANGUAGE | = JAPANESE |
| GET FAX_NUMBER | = 0271234567 |
| GET IP_ADDRESS | = N/A |
| GET SUBNET_MASK | = N/A |
| GET GATEWAY | = N/A |
| Job End Command | |

| Items | Values |
|---|---|
| LANGUAGE_SETTING | TRUE |
| TIME_SETTING | TRUE |
| FAX_SETTING | TRUE |
| NETWORD_SETTING | FALSE |
| LANGUAGE | ENGLISH |
| FAX_NUMBER | 0271234567 |
| IP_ADDRESS | N/A |
| SUBNET_MASK | N/A |
| GATEWAY | N/A |

I11 → LANGUAGE_SETTING

I15 → LANGUAGE

Fig. 28

| | |
|---|---|
| Job Start Command | |
| SET LANGUAGE_SETTING | = TRUE |
| SET LANGUAGE | = ENGLISH |
| Job End Command | |

Fig. 29

| | |
|---|---|
| Job Start Command | |
| SET NETWORK_SETTING | = TRUE |
| SET IP_ADDRESS | = 100.120.50.10 |
| SET SUBNET_MASK | = 255.255.255.0 |
| SET GETEWAY | = 100.120.50.99 |
| Job End Command | |

Fig. 30

| Items | Values | Apparatus Names |
|---|---|---|
| LANGUAGE_SETTING | FALSE | |
| TIME_SETTING | TRUE | Printer1 |
| FAX_SETTING | TRUE | PC1 |
| NETWORD_SETTING | FALSE | |
| LANGUAGE | JAPANESE | |
| FAX_NUMBER | 0271234567 | |
| IP_ADDRESS | N/A | |
| SUBNET_MASK | N/A | |
| GATEWAY | N/A | |

IMAGE FORMING SYSTEM, INFORMATION PROCESSING APPARATUS AND SETTING METHOD

CROSS REFERENCE

The present application is related to, claims priority from and incorporates by reference Japanese Patent Application No. 2014-235215, filed on Nov. 20, 2014.

TECHNOLOGY FIELD

The present invention relates to an image forming system, an information processing apparatus, and a setting method for performing a setting for an image forming apparatus.

BACKGROUND

In recent years, an image processing system for providing a plurality of input means for an image processing device has become widespread. For example, there is a system for providing an external extension panel in addition to an operation panel built in an image processing device, and for providing a device setting tool operating on a host PC. Further, in Patent Document 1, in order to prevent malfunction due to simultaneous operations of an image processing device through a plurality of input means, an image processing system capable of setting the priority of operation instructions from the plurality of input means is disclosed.

RELATED PRIOR ART

Patent Doc. 1: Patent Laid-Open Publication: JP2005-313413

To make the image processing device in an available state, various initial settings such as a language setting, a time setting, etc., for the image processing device are needed. In an image forming system providing a plurality of input means for an image processing device, when performing an initial setting of the image processing device, there is a possibility that a set item already set by a certain input means may be overwritten by a different input means. It is acceptable when a user intentionally overwrites, but there was a problem that an user might unintentionally overwrite without knowing the fact that a setting had already been set.

In the image processing system described in Patent Document 1, by setting a priority for operation instructions from a plurality of input means, items relating to given functions can only be operated by a specified input means. In other words, in the image processing system described in Patent Document 1, for items relating to given functions, since the operation can only be performed by a specified input means, unintentional overwriting can be prevented. However, in the image processing system described in Patent Document 1, even when a setting is not performed for an item relating to a given function, for items relating to given functions, since the operation can only be performed by a specified input means, the user's convenience is significantly deteriorated.

Therefore, the present invention aims to prevent an already set item from being changed unintentionally without deteriorating the user's inconvenience.

SUMMARY

An image forming system disclosed in the application includes a first display input part that displays a first selection screen for selecting an item to perform a setting among a plurality of predetermined items for performing a setting for an image forming apparatus, and receives a setting for an item selected on the first selection screen, and a second display input part that displays a second selection screen for selecting an item to perform a setting among the predetermined items in which an already set item is eliminated, the already set item being defined as an item for which the setting has been performed, and receives a setting for an item selected on the second selection screen.

A setting method disclosed in the application includes step that displays a selection screen for selecting an item to perform a setting among items other than an item for which a setting has been already performed among a plurality of items for performing a setting on an image forming apparatus, and step receives a selection of an item in the second selection screen and receives a setting of the selected item.

The setting method according to an embodiment of the present invention includes step for displaying a first selection screen for selecting an item to perform a setting among a plurality of predetermined items for performing a setting for an image forming apparatus, step for receiving a setting for the item selected on the first selection screen, step for displaying a second selection screen for selecting an item to perform a setting among items other than an already set item among a plurality of items, and step for receiving a setting for the item selected on the second selection screen.

According to an embodiment of the present invention, it becomes possible to prevent a setting item that has already been set from being changed unintentionally without deteriorating the user's convenience.

BRIEF DESCRIPTION OF THE DRAWINGS

FIG. 23 is a schematic diagram showing an example of an apparatus parameter obtaining command according to Embodiment 1.

FIG. 24 is a schematic diagram showing an example of an apparatus parameter setting command according to Embodiment 1.

FIG. 27 is a schematic diagram showing an example of an apparatus parameter of an information processing apparatus according to Embodiment 1.

FIG. 28 is a schematic diagram showing a first example of an apparatus parameter updating command according to Embodiment 1.

FIG. 29 is a schematic diagram showing a second example of the apparatus parameter updating command according to Embodiment 1.

FIG. 30 is a schematic diagram showing a modified example of the apparatus parameter of the image forming apparatus according to Embodiment 1.

DETAILED DESCRIPTIONS OF THE EMBODIMENTS

Figure 1:
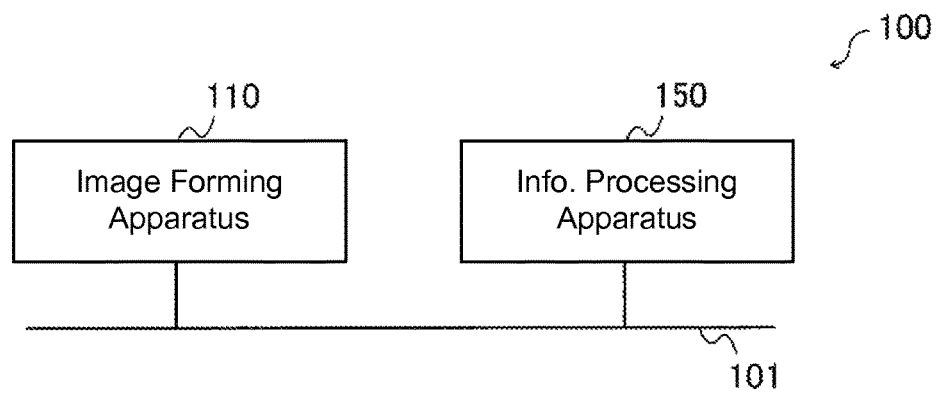
FIG. 1 is a schematic diagram schematically showing a structure of an image forming system according to a first embodiment.

Embodiment 1
(Explanation of Structure) FIG. 1 is a schematic drawing which schematically shows a structure of an image forming system 100 according to Embodiment 1. The image forming system 100 includes an image forming apparatus 110 and an information processing apparatus 150. The image forming apparatus 110 and the information processing apparatus 150 are connected to a network 101 such as a LAN (Local Area Network), etc. The image forming apparatus 110 according to Embodiment 1 is a multifunction machine equipped with a print function, a scan function, a copy function and a facsimile function. The image forming apparatus 110 is equipped with a display input part which performs settings on the apparatus. The information processing apparatus 150 is an apparatus for providing a display input part for performing a setting on the image forming apparatus 110. The network 101 is a communication line connecting the image forming apparatus 110 and the information processing apparatus 150 by a known communication technology.

Figure 2:
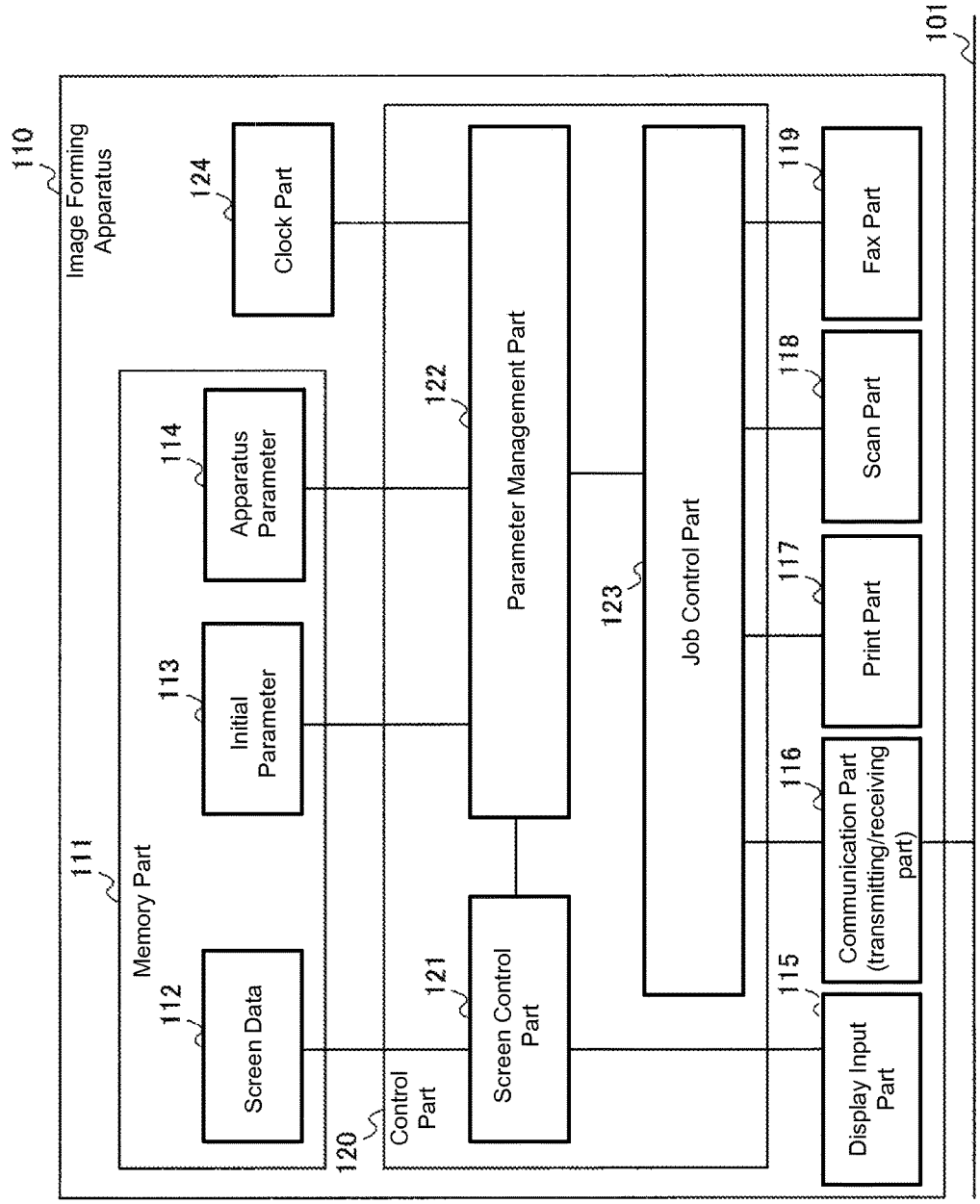
FIG. 2 is a schematic block diagram schematically showing a structure of an image forming apparatus according to Embodiment 1.

FIG. 2 is a block diagram schematically showing the structure of the image forming apparatus 110. The image forming apparatus 110 is equipped with a memory part 111, a display input part 115, a communication part 116, a print part 117, a scan part 118, a facsimile part 119, a control part 120, and a clock part 124.

The memory part 111 stores information necessary for processing in the image forming apparatus 110. For example, the memory part 111 stores screen data 112, an initial parameter 113, and an apparatus parameter 114. The screen data 112 is data for depicting a screen for displaying on the display input part 115. For example, the screen data 112 includes layout information and icon information to be used when depicting a screen. The initial parameter 113 is initial setting information showing an initial value of an item set as an initial setting for the image forming apparatus 110. The apparatus parameter 114 is setting information showing a value of an item set as an initial setting for the image forming apparatus 110. The apparatus parameter 114 is configured such that an already set item can be identified. The initial value of the apparatus parameter 114 is shown by the initial parameter 113.

The display input part 115 functions as a display part for displaying a screen and an input part for receiving inputs. For example, the display input part 115 displays a selection screen for selecting an item for performing a setting among a plurality of predetermined items to perform a setting on the image forming apparatus 110, and receives a setting for the item selected on the selection screen. Here, on the selection screen displayed by the display input part 115, an item to perform a setting can be selected among all of the plurality of predetermined items to perform a setting on the image forming apparatus 110. The communication part 116 performs a communication via the network 101. For example, the communication part 116 functions as a receiving part for receiving data via the network 101 and a transmitting part for transmitting data via the network. The print part 117 is an image forming part for forming an image on a medium. The scan part 118 reads image data from a manuscript. The facsimile part 119 transmits and receives image data via a telephone line which is not illustrated.

The control part 120 controls the processing in the image forming apparatus 110. The control part 120 is equipped with a screen control part 121, a parameter management part 122, and a job control part 123. The screen control part 121 generates image data depicting a screen to be displayed on the display input part 115 and provides the image data to the display input part 115 to display the screen. Further, the screen control part 121, according to an input received by the display input part 115, transits the screen to be displayed on the display input part 115. The parameter management part 122 performs management of the apparatus parameter 114. The job control part 123 controls the communication part 116, the print part 117, the scan part 118 and the facsimile part 119 to perform functions of the image forming apparatus 110. A clock part 124 clocks the time. The time clocked by the clock part 124 is treated as the current time.

Figure 3:
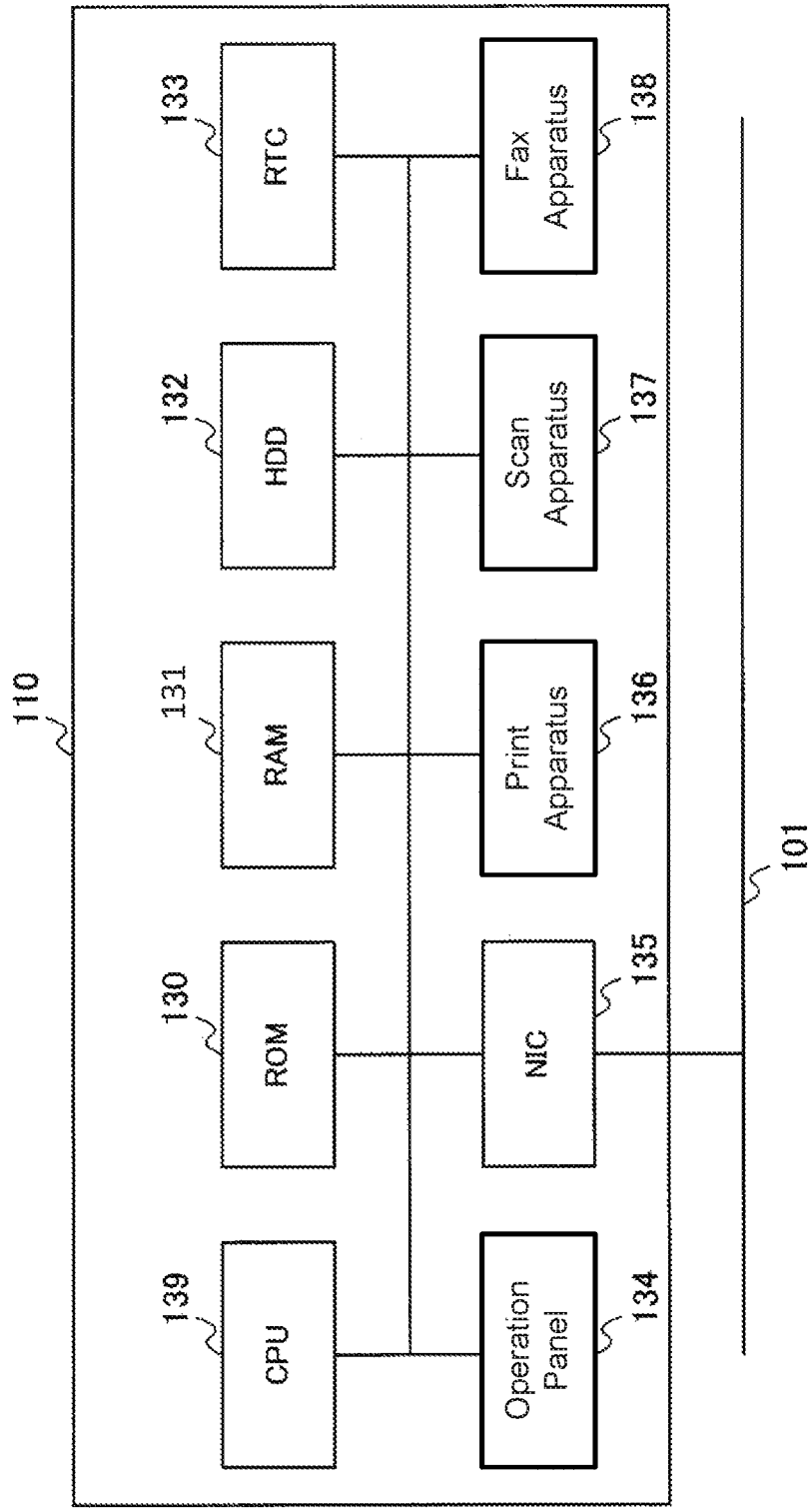
FIG. 3 is a block diagram showing an example of a hardware structure of the image forming apparatus according to Embodiment 1.

FIG. 3 is a block diagram showing an example of the hardware structure of the image forming apparatus 110 according to Embodiment 1. The image forming apparatus 110 is equipped with a ROM (Read Only Memory) 130, a RAM (Random Access Memory) 131, a HDD (Hard Disk Drive) 132, a RTC (Real Time Clock) 133, an operation panel 134, a NIC (Network Interface Card) 135, a print apparatus 136,
a scan apparatus 137, a facsimile apparatus 138, and a CPU (Central Processing Unit) 139.

Figure 4:
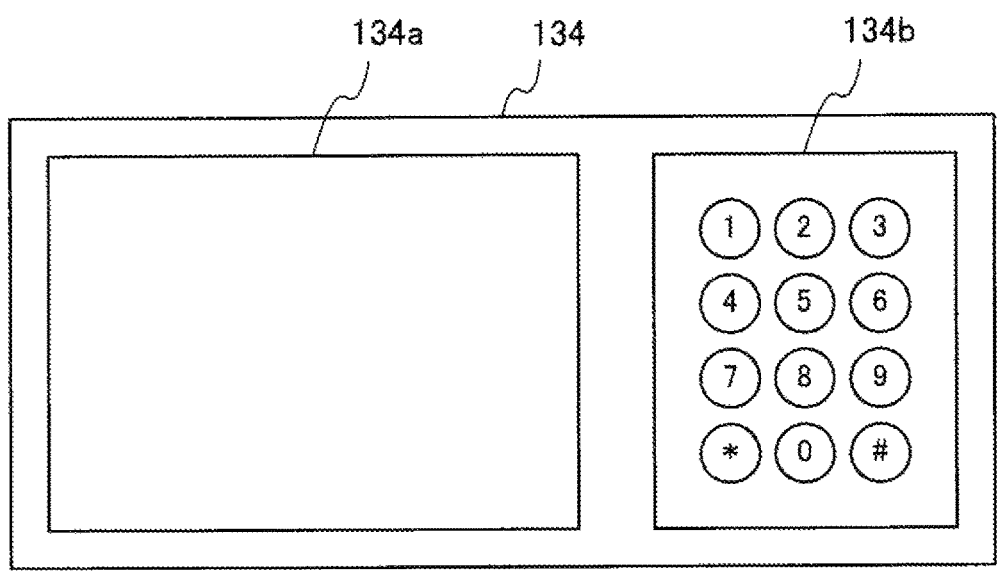
FIG. 4 is a schematic diagram showing an example of an operation panel according to Embodiment 1.

The ROM 130 is a memory medium for storing programs and data for operating the image forming apparatus 110 as read-only. The RAM 131 is a memory medium for volatizably storing a variety of storing information. The HDD 132 is a memory medium for non-volatizably storing a variety of storing information. The RTC 133 is a clock which clocks the current time with an internal battery even when the power source of the image forming apparatus 110 is disconnected. The operation panel 134 is an apparatus which displays a screen to receive inputs. For example, the operation panel 134 is, as shown in FIG. 4, equipped with a touch panel 134a and a ten-key 134b. The NIC 135 is an apparatus for transmitting and receiving data via the network 101 using a known communication technology. The print apparatus 136 is an apparatus for printing on a paper medium using a known printing technology. The scan apparatus 137 is an apparatus for reading image data with a known optical reading technology. The facsimile apparatus 138 is an apparatus for transmitting and receiving image data via a telephone line using a known communication technology. The CPU 139 is a processor for controlling operations of the entire image forming apparatus 110.

The correspondence between the structure of the image forming apparatus 110 shown in FIG. 2 and the hardware of the image forming apparatus 110 shown in FIG. 3 will be explained. The memory part 111 can be realized when the CPU 139 utilizes the ROM 130, the RAM 131, and the HDD 132. The display input part 115 can be realized when the CPU 139 utilizes the operation panel 134. The communication part 116 can be realized by when the CPU 139 utilizes the NIC 135. The print part 117 can be realized when the CPU 139 utilizes the print apparatus 136.
The scan part 118 can be realized when the CPU 139 utilizes the scan apparatus 137. The facsimile part 119 can be realized when the CPU 139 utilizes the facsimile apparatus 138. The control part 120 can be realized when the CPU 139 reads out a program stored in the ROM 130 or the HDD 132 to the RAM 131 and executing it. The clock part 124 can be realized with the RTC 133. Here, it is configured such that the control part 120 can be realized by the CPU 139 executing a program, but it is not limited to such an example. All or a part of the functions of the control part 120 can be realized by hardware by a integrated logic IC such as ASIC (Application Specific Integrated Circuits), FPGA (Field Programmable Gate Array), etc., or by software such as DSP (Digital Signal Processor), etc.

Figure 5:
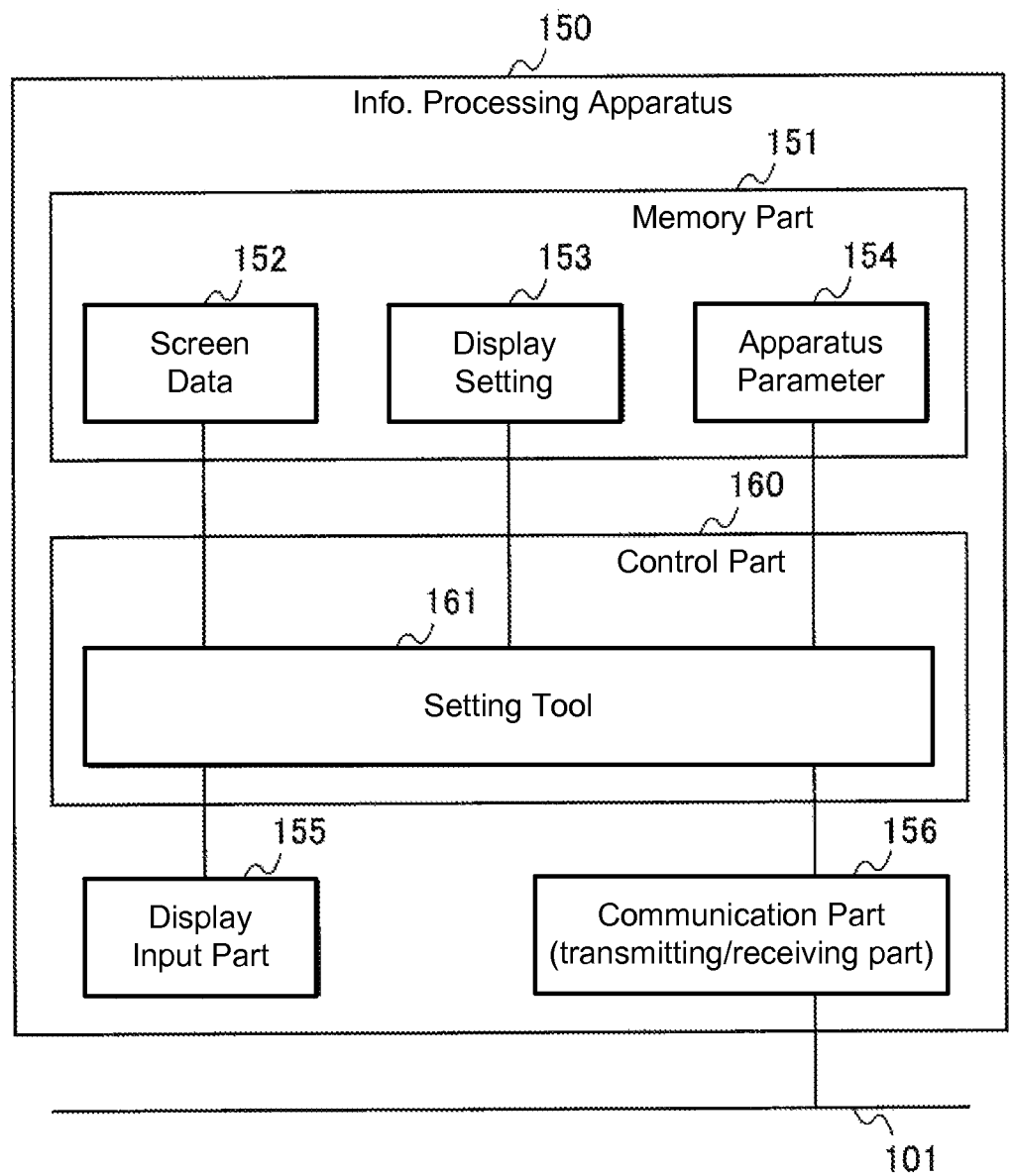
FIG. 5 is a block diagram schematically showing a structure of an information processing apparatus according to Embodiment 1.

FIG. 5 is a block diagram schematically showing the structure of the information processing apparatus 150. The information processing apparatus 150 is equipped with a memory part 151, a display input part 155, a communication part 156, and a control part 160. The memory part 151 stores information necessary for processing in the information processing apparatus 150. For example, the memory part 151 stores screen data 152, a display setting 153, and an apparatus parameter 154. The screen data 152 is data for depicting a screen to be displayed by the display input part 155. For example, the screen data 152 includes layout information and icon information used when depicting a screen. The display setting 153 is information showing a display method of an apparatus initial setting screen to be displayed by the display input part 155. For example, the display setting 153 shows that an already set item is not displayed or that all items are displayed. The apparatus parameter 154 shows a value of an item set as an initial setting for the image forming apparatus 110.

The display input part 155 functions as a display part for displaying a screen and an input part for receiving inputs. For example, the display input part displays a selection screen for selecting an item to perform a setting among items other than the item in which a setting is already performed among a plurality of predetermined items to perform a setting on the image forming apparatus 110, and receives the setting for an item selected from the selection screen. Further, the display input part 155, when it receives an instruction from a user, displays a selection screen for selecting an item for performing a setting among all of the plurality of items for performing a setting on the image forming apparatus 110. The communication part 156 performs communication via the network 101. For example, the communication part 156 functions as a receiving part for receiving data via the network 101 and a transmitting part for transmitting data via the network.

The control part 160 controls the processing of the information processing apparatus 150. For example, the control part 160 is equipped with a setting tool 161.
The setting tool 161 is an initial setting part for performing an initial setting of the image forming apparatus 110. For example, the setting tool 161 obtains a value shown by the apparatus parameter 114 in the image forming apparatus 110 from the image forming apparatus 110 via the communication part 156, and based on the obtained value, make the memory part 151 store the apparatus parameter 154. Then, the setting tool 161, based on the apparatus parameter 154 and the display setting 153, selects an item to be set as an initial setting on the image forming apparatus 110, then makes the display input part 155 display a screen for inputting the value of the item to receive an input for a necessary value. The setting tool 161 transmits the input value to the image forming apparatus 110 via the communication part 156 to reflect on the apparatus parameter 114 of the image forming apparatus 110. Here, the setting tool 161 is used for performing an initial setting on the image forming apparatus 110. Therefore, in cases where the initial setting has already been performed, the control part 160 other than the setting tool 161 performs processing such as a selection of an item for performing a setting, a setting of the selected item, etc.

Figure 6:
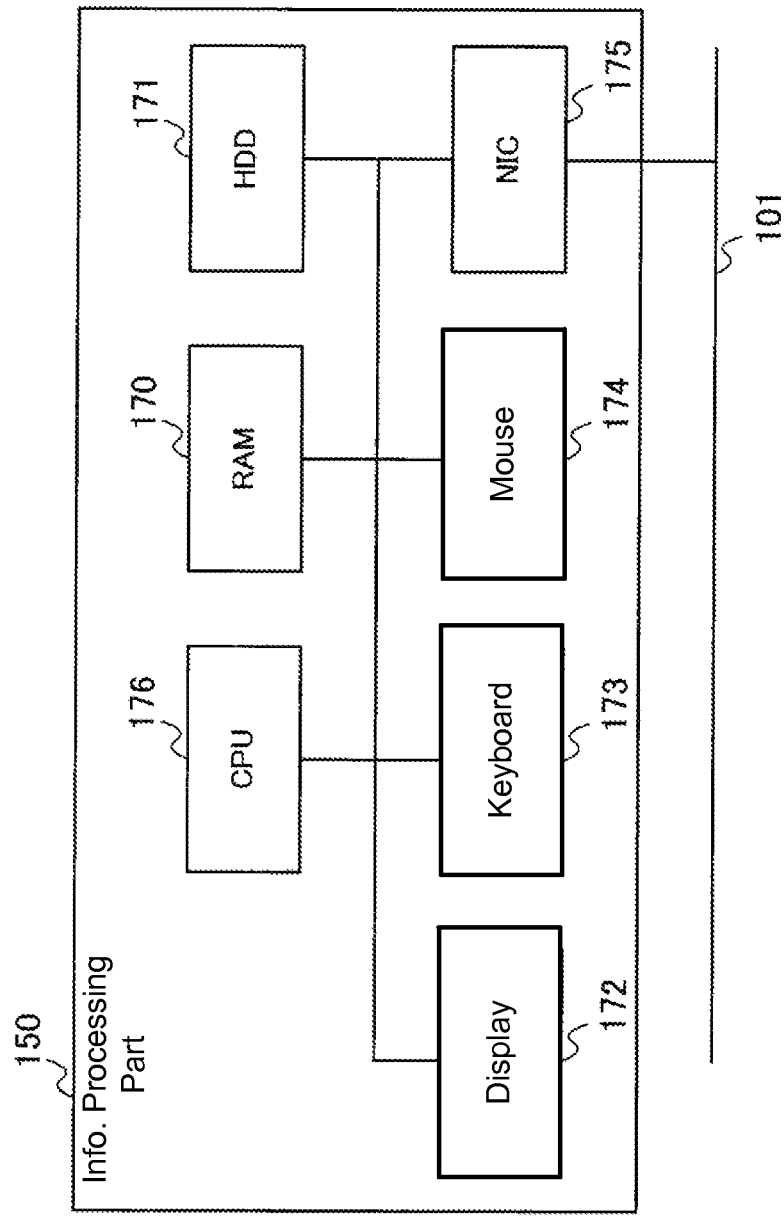
FIG. 6 is a block diagram showing an example of a hardware structure of the information processing apparatus according to Embodiment 1.

FIG. 6 is a block diagram showing an example of the hardware structure of the information processing apparatus 150. The information processing apparatus 150 is equipped with a RAM 170, a HDD 171, a display 172, a keyboard 173, a mouse 174, a NIC 175, and a CPU 176.

The RAM 170 is a memory medium for volatizably storing a variety of recording information. The HDD 171 is a memory medium for non-volatizably storing a variety of recording information. The display 172 is a display apparatus for displaying a screen image with a known display technology. The keyboard 173 is an input apparatus for transmitting an input signal such as characters, etc., by pressing down of a key. The mouse 174 is an input apparatus for specifying a point position by transmitting a two-dimensional movement information. The NIC 175 is an apparatus for transmitting and receiving data via the network 101 using a known communication technology. The CPU 176 is a processor for controlling the operation of the entire information processing apparatus 150.

The structure of the information processing apparatus 150 shown in FIG. 5 and the correspondence with the hardware of the information processing apparatus 150 shown in FIG. 6 will be explained. The memory part 151 can be realized when the CPU 176 utilizes the RAM 170 and the HDD 171. The display input part 155 can be realized when the CPU 176 utilizes the display 172, the keyboard 173, and the mouse 174. The communication part 156 can be realized when the CPU 176 utilizes the NIC 175. The control part 160 can be realized when the CPU 176 reads out a program stored in the HDD 171 to the RAM 170 and executes it. Here, it is configured such that the control part 160 can be realized when the CPU 176 executes a program, but it is not limited to that. All or a part of functions of the control part 160 can be realized by hardware by an integrated logic IC such as ASIC, FPGA, etc., or by software such as DSP, etc.

(Explanation of Operations)

Figure 7:
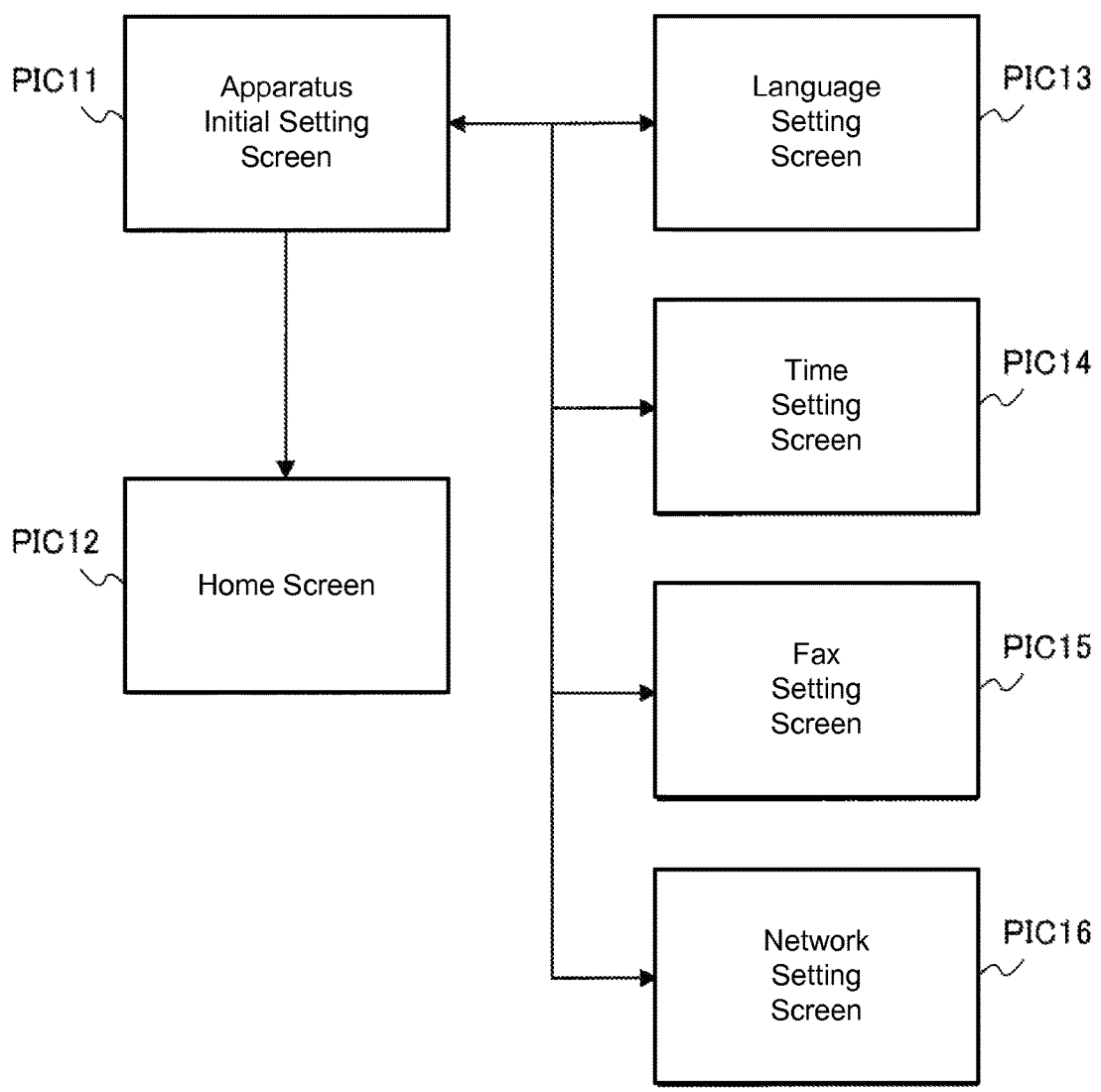
FIG. 7 is a schematic diagram showing a flow of a screen displayed on a display input part of the image forming apparatus according to Embodiment 1.
Figure 8:
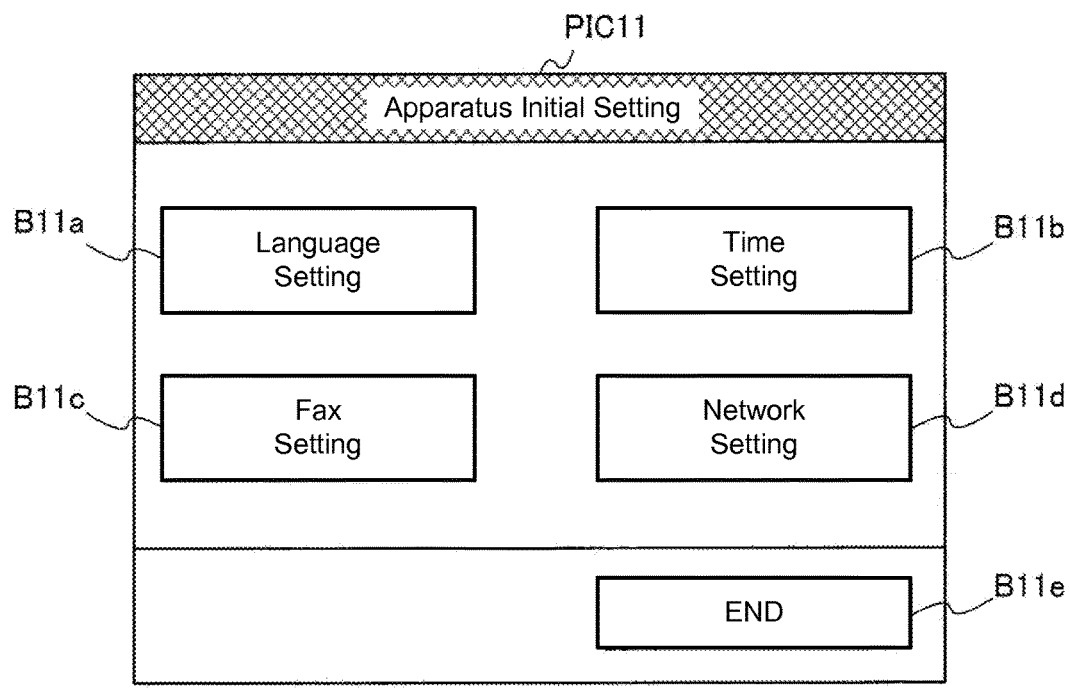
FIG. 8 is a schematic diagram showing an example of a device initial setting screen according to Embodiment 1.
Figure 9:
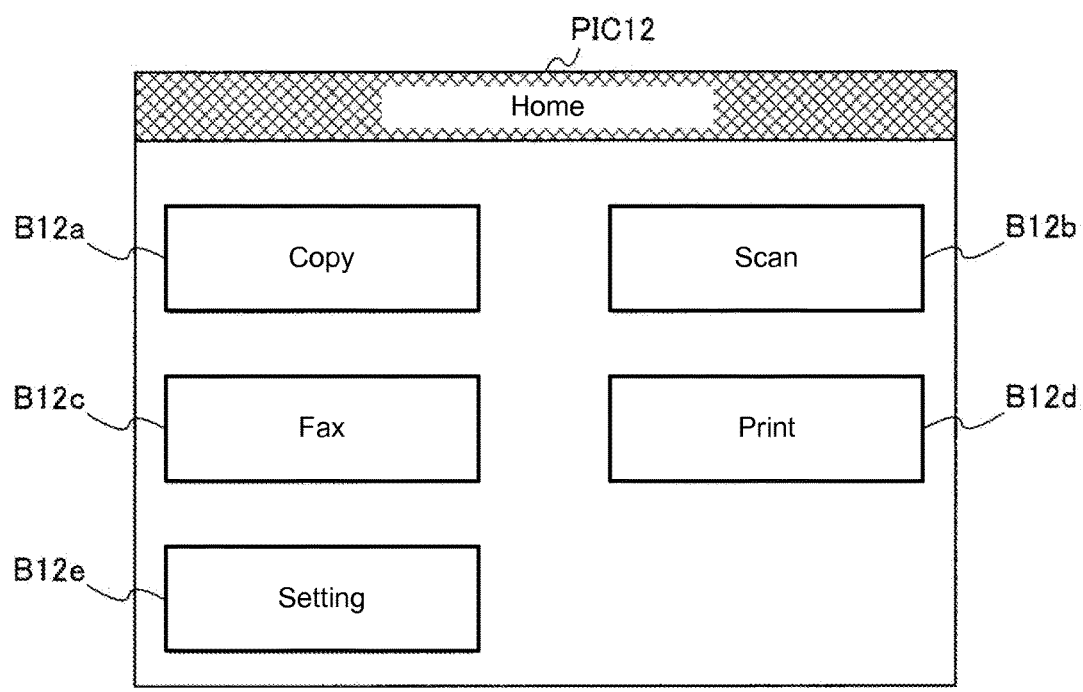
FIG. 9 is a schematic diagram showing an example of a home screen according to Embodiment 1.
Figure 10:
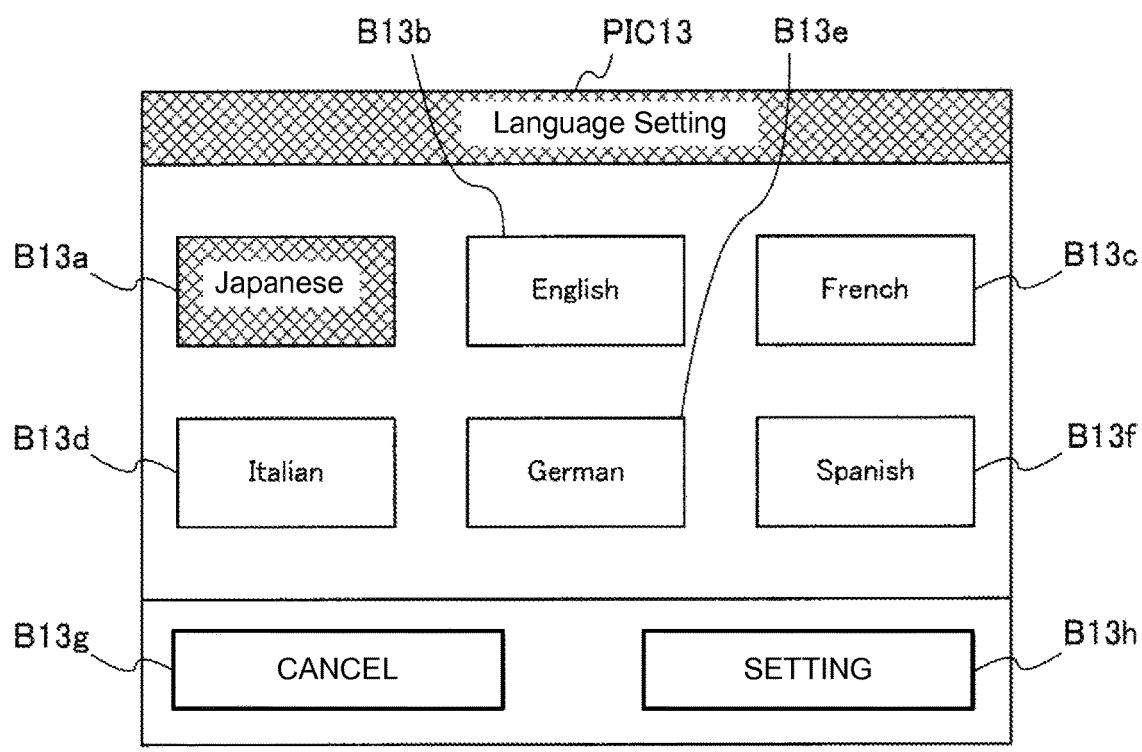
FIG. 10 is a schematic diagram showing an example of a language setting screen according to Embodiment 1.
Figure 11:
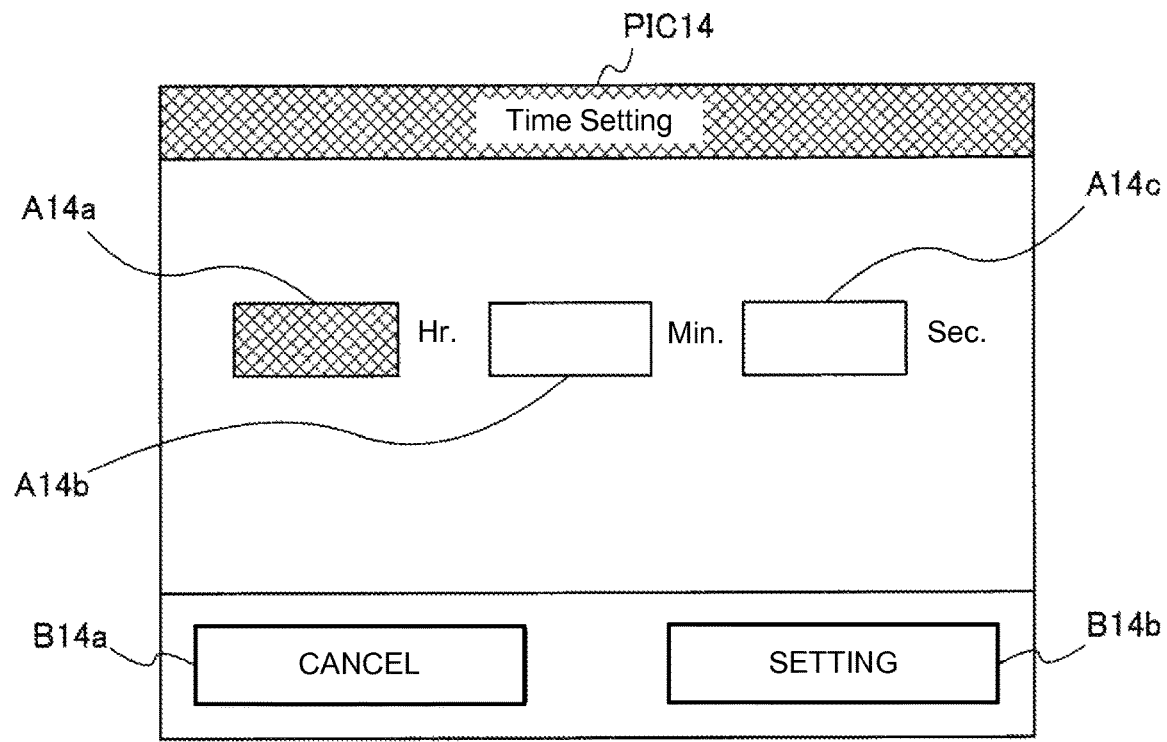
FIG. 11 is a schematic diagram showing an example of a time setting screen according to Embodiment 1.
Figure 12:
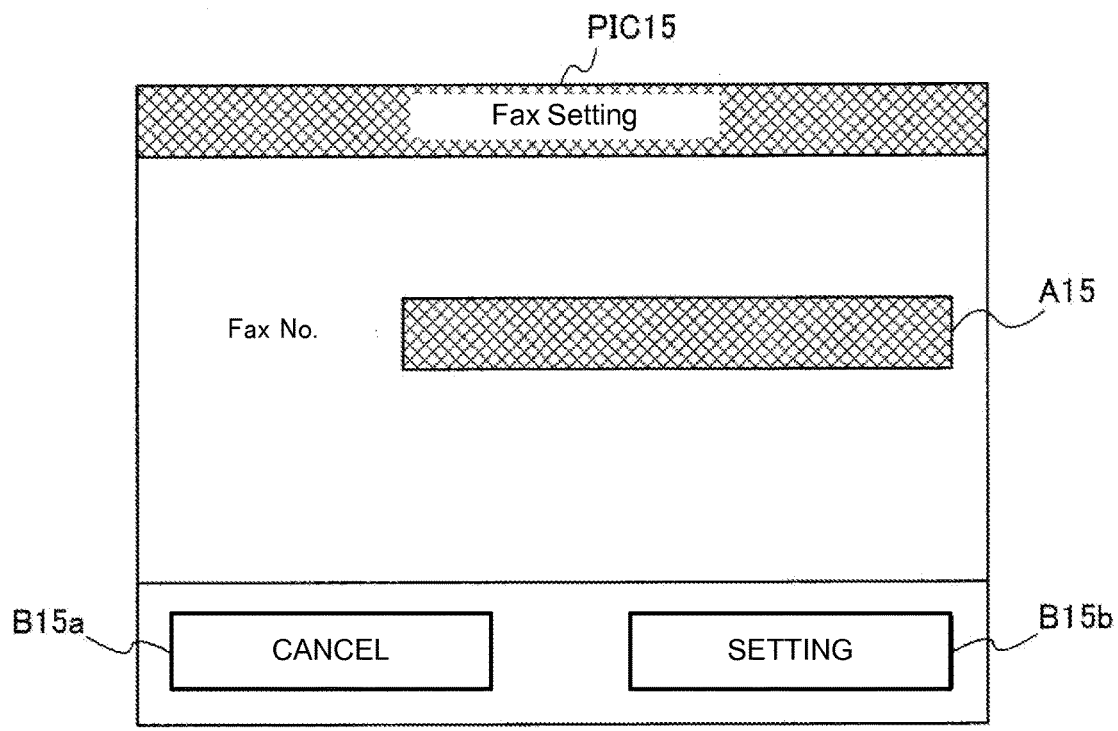
FIG. 12 is a schematic diagram showing an example of a facsimile setting screen according to Embodiment 1. Throughout the drawings, a facsimile is abbreviated by FAX.
Figure 13:
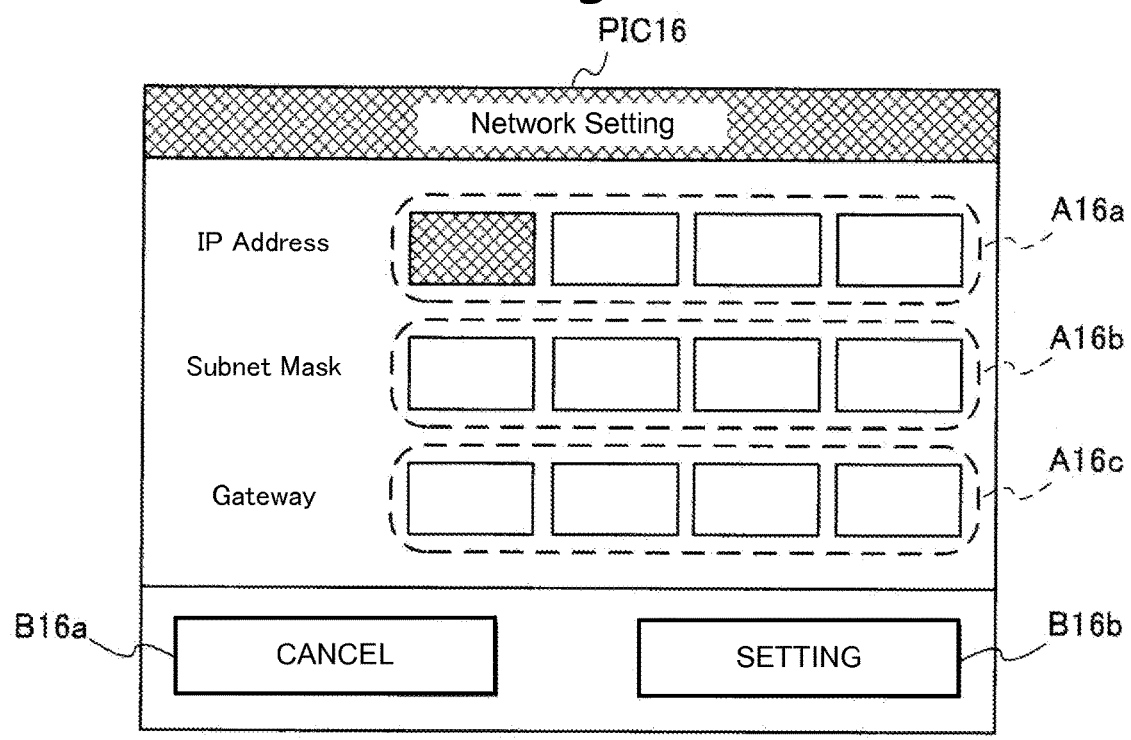
FIG. 13 is a schematic diagram showing an example of a network setting screen according to Embodiment 1.

FIG. 7 is a schematic diagram showing a flow of a screen displayed on the display input part 115 of the image forming apparatus 110. On the display input part 115 of the image forming apparatus 110, according to the state of the initial setting of the image forming apparatus 110, an apparatus initial setting screen PIC11 or a home screen PIC12 is displayed. FIG. 8 is a schematic diagram showing an example of the apparatus initial setting screen PIC11. The apparatus initial setting screen PIC11 is a selection screen for selecting an item to perform a setting. FIG. 9 is a schematic diagram showing an example of the home screen PIC12. When an item to perform a setting is selected on the apparatus initial setting screen PIC11, on the display input part 115, a language setting screen PIC13, a time setting screen PIC14, a facsimile setting screen PIC15, and a network setting screen PIC16 are displayed. FIG. 10 is a schematic diagram showing an example of the language setting screen PIC13. FIG. 11 is a schematic diagram showing an example of the time setting screen PIC14. FIG. 12 is a schematic diagram showing an example of the facsimile setting screen PIC15. FIG. 13 is a schematic diagram showing an example of the network setting screen PIC16. In the following explanation, as a generic term for the language setting screen PIC13, the time setting screen PIC14, the facsimile setting screen PIC15, and the network setting screen PIC16, the term "setting screen" will be used. Further, the operations of each screen which will be explained later are performed by the screen control part 121. At the time of depicting each screen, the screen control part 121 uses screen data 112.

Figure 14:
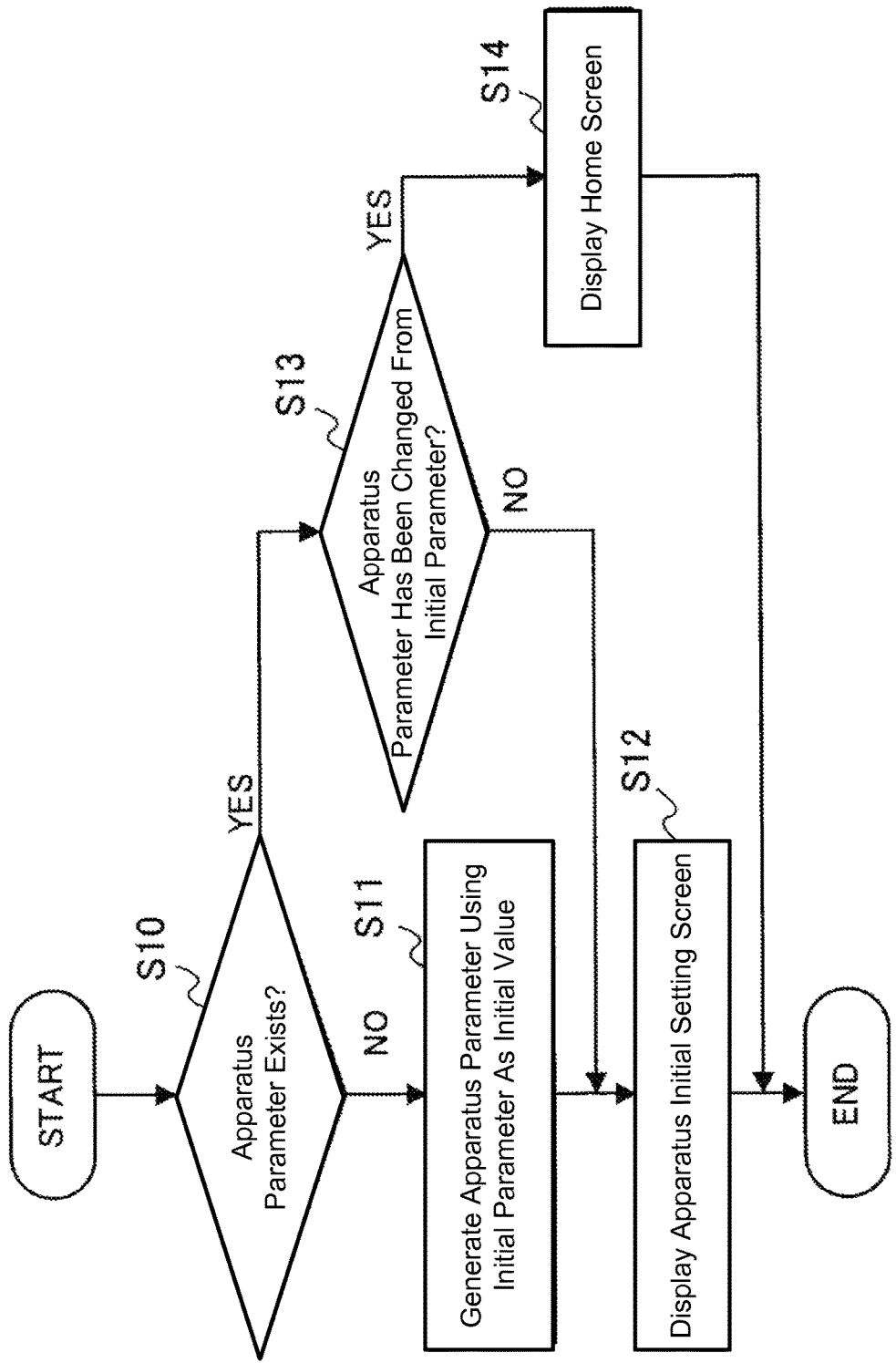
FIG. 14 is a flowchart showing operations of the image forming apparatus at a time of starting according to Embodiment 1.

FIG. 14 is a flowchart showing operations of the image forming apparatus 110 at the time of starting. The flow shown in FIG. 14 is started, for example, when the power source of the image forming apparatus 110 is turned on. The parameter management part 122 confirms whether or not an apparatus parameter 114 exists in the memory part 111 (S10). In a case in which an apparatus parameter 114 does not exist (No in Step S10), the image forming apparatus 110 is started for the first time. In this case, since it is in a state in which an initial setting is not performed, the parameter management part 122 generates an apparatus parameter 114 using an initial parameter 113 stored in the memory part 111 as an initial value and makes the memory part 111 (S11) store the parameter. Then, in order to have a user perform the initial setting of the image forming apparatus 110, the screen control part 121 makes the display input part 115 display the apparatus initial setting screen PIC11 (S12).

On the other hand, in a case in which an apparatus parameter 114 does exist (Yes in Step S10), the parameter management part 122 confirms whether or not the apparatus parameter 114 has been changed from the initial parameter 113 (S13). In a case in which even one of the values included in the apparatus parameter 114 has been changed from the value included in the initial parameter 113, the parameter management part 122 judges that the apparatus parameter 114 has been changed from the initial parameter 113. Further, in a case in which a specific value included in the apparatus parameter 114 has been changed from the value included in the initial parameter 113, the parameter management part 122 can judge that the apparatus parameter 114 has been changed from the initial parameter 113. For example, since time is used for a plurality of functions, when such the setting is not performed, problems may arise in a plurality of functions. Therefore, in a case in which a setting for time is not performed, the parameter management part 122 can judge that the apparatus parameter 114 has not been changed from the initial parameter 113.

In a case in which the apparatus parameter 114 has not been changed from the initial parameter 113 (No in Step S13), it advances to Step S12. In order to make a user perform the initial setting of the image forming apparatus 110, the screen control part 121 makes the display input part 115 display the apparatus initial setting screen PIC11. In other words, until an initial setting is performed by a user, to encourage an initial setting by a user, an apparatus initial setting screen PIC11 will be displayed at the time of starting the image forming apparatus 110. In a case in which the apparatus parameter 114 has been changed from the initial parameter 113 (Yes in Step S13), it is judged that an initial setting by a user has been already performed, and the screen control part 121 displays a home screen PIC12 on the display input part 115 without displaying the apparatus initial setting screen PIC11 (S14).

As described above, in a case in which the image forming apparatus 110 is started in a state in which an initial setting by a user has not been performed, as an initial screen after starting, the apparatus initial setting screen PIC11 shown in FIG. 8 will be displayed. Hereinafter, a button is a region for inputting an instruction. On the apparatus initial setting screen PIC11, when an end button B11*e* is depressed (or touched, clicked), the home screen PIC12 shown in FIG. 9 will be displayed. The home screen PIC12 includes a copy button B12*a*, a scan button B12*b*, a facsimile button B12*c*, a print button B12*d*, and a setting button B12*e*. When the copy button B12*a* is depressed, the job control part 123 of the image forming apparatus 110 executes a copy function. When the scan button B12*b* is depressed, the job control part 123 of the image forming apparatus 110 executes a scan function. When the facsimile button B12*c* is depressed, the job control part 123 of the image forming apparatus 110 executes a facsimile function. When the print button B12*d* is depressed, the job control part 123 of the image forming apparatus 110 performs a print function. When the setting button B12*e* is depressed, the screen control part 121 displays a detailed setting screen (not illustrated) that is different from the apparatus initial setting screen PIC11 on the display input part 115 so that detailed settings of the image forming apparatus 110 can be received.

On the apparatus initial setting screen PIC11 shown in FIG. 8, when the language setting button B11*a* is depressed, the language setting screen PIC13 as shown in FIG. 10 is displayed. The language setting screen PIC13 includes language selection buttons B13*a*-B13*f*, a cancel button B13*g*, and a setting button B13*h*. When the language selection button B13*a*-B13*f* are depressed, a language displayed on the language selection buttons B13*a*-B13*f* will be selected. In case in which the cancel button B13*g* is depressed, the selection of a language by the language selection button B13*a*-B13*f* is cancelled, and the screen returns to the apparatus initial setting screen PIC11. In a case in which the setting button B13*h* is depressed, the language selected by the language selection button B13a-B13f is set as the apparatus parameter 114, and the screen goes back to the apparatus initial setting screen PIC11.

On the apparatus initial setting screen PIC11 shown in FIG. 8, when the time setting button B11b is depressed, the time setting screen PIC14 shown in FIG. 11 will be displayed. The time setting screen PIC14 includes an hour input column A14a, a minute input column A14b, a second put column A14c, a cancel button B14a, and a setting button B14b. The hour input column A14a receives an input for the hour. The minute input column A14b receives an input for the minute. The second input column A14c receives an input for the second. In a case in which the cancel button B14a is depressed, the inputs for the hour input column A14a, the minute input column A14b, and the second input column A14c are cancelled, and the screen goes back to the apparatus initial setting screen PIC11. In a case in which the setting button B14b is depressed, the time input to the hour input column A14a, the minute input column A14b, and the second input column A14c is set for the clock part 124 as the current time, and the screen returns to the apparatus initial setting screen PIC11. In addition, the setting button B14b is configured so that it cannot be depressed unless inputs to the hour input column A14a, the minute input column A14b, and the second input column A14c have not been made.

On the apparatus initial setting screen PIC11 shown in FIG. 8, when the facsimile setting button B11c is depressed, the facsimile setting screen PIC15 shown in FIG. 12 will be displayed. The facsimile setting screen PIC15 includes a facsimile number input column A15, a cancel button B15a, and a setting button B15b. The facsimile number input column A15 receives an input of a facsimile number. In case in which the cancel button B15a is depressed, the input to the facsimile number input column A15 is cancelled, and the screen goes back to the apparatus initial setting screen PIC11. In case in which the setting button B15b is depressed, the facsimile number input into the facsimile number input column A15 is set as the apparatus parameter 114, and the screen goes back to the apparatus initial setting screen PIC11. Further, the setting button B15b is set so as not to be depressed unless an input is made to the facsimile number input column A15.

On the apparatus initial setting screen PIC11 shown in FIG. 8, when the network setting button B11d is depressed, the network setting screen PIC16 as shown in FIG. 13 will be displayed. The network setting screen PIC16 includes an IP address input column A16a, a subnet mask input column A16b, a gateway input column A16c, a cancel button B16a, and a setting button B16b. The IP address input column A16a receives an input of an IP addresses. The subnet mask input column A16b receives an input of a value of a subnet mask. The gateway input column A16c receives an input of a value of a gateway. In a case in which the cancel button B16b is depressed, the inputs to the IP address input column A16a, the subnet mask input column A16b, and the gateway input column A16c are cancelled, and the screen goes back to the apparatus initial setting screen PIC11. In a case in which the setting button B16b is depressed, the communication setting input to the IP address input column A16a, the subnet mask input column A16b, and the gateway input column A16c is set as the apparatus parameter 114, and the screen goes back to the apparatus initial setting screen PIC11. Further, the setting button B16b is set so as not to be depressed unless inputs are made to the IP address input column A16a, the subnet mask input column A16b, and the gateway input column A16c.

Figure 15:
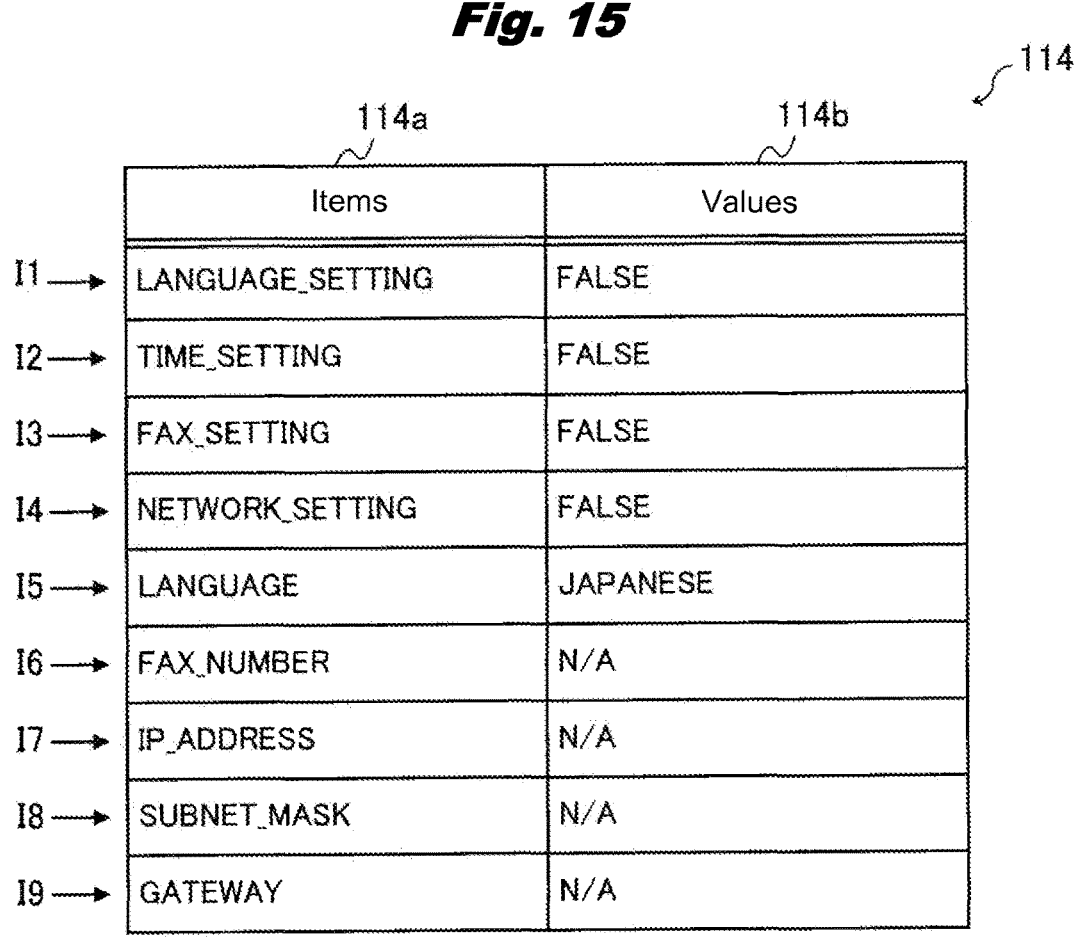
FIG. 15 is a schematic diagram showing initial values of device parameters according to Embodiment 1.

FIG. 15 is a schematic diagram showing initial values of the apparatus parameter 114. The initial parameter 113 holds the values shown in FIG. 15 as fixed values. The apparatus parameter 114 includes an item column 114a and a value column 114b, and the value of the item specified by the item column 114a is stored in the value column 114b. The value of the item I1 shows whether or not a language setting (LANGUAGE_SETTING) was performed. In a case in which a language setting has not been performed, the value of item I1 is "FALSE", indicating that it has not been performed, and in a case in which a language setting has been performed, the value of item I1 is "TRUE", indicating that it has already been performed. In the initial value, the value of the item I1 is "FALSE". The value of item I2 shows whether or not a time setting (TIME_SETTING) has been performed. In a case in which a time setting has not been performed, the value of item I2 is "FALSE", indicating that it has not been performed, and in a case in which a language setting has been performed, the value of item is "TRUE", indicating that it has already been performed. In the initial value, the value of item I2 is "FALSE".

The value of item I3 shows whether or not a facsimile setting (FAX_SETTING) has been performed. In a case in which a facsimile setting has not been performed, the value of item I3 is "FALSE", indicating that it has not been performed, and in a case in which a facsimile setting has been performed, the value of item I3 is "TRUE", indicating that it has already been performed. In the initial value, the value of the item I3 is "FALSE". The value of item I4 shows whether or not a network setting (NETWORK_SETTING) has been performed. In a case in which a network setting has not been performed, the value of item I4 is "FALSE", indicating that it has not been performed, and in a case in which a language setting has been performed, the value of item I4 is "TRUE", indicating that it has already been performed. In the initial value, the value of item I4 is "FALSE".

The value of item I5 is stored as information indicating the language to be used in the image forming apparatus 110. In the initial values, the value of item I5 is "JAPANESE". The value of item I6 is stored as a facsimile number to be used in the image forming apparatus 110. In the initial value, the value of item I6 is "N/A", indicating that it has not been set. The value of item I7 is stored as an IP addresses to be used in the image forming apparatus 110. In the initial value, the value of item I7 is "N/A", indicating that it has not been set. The value of item I8 is stored as a value of a subnet mask to be used in the image forming apparatus 110. In the initial value, the value of item I8 is "N/A", indicating that it has not been set. The value of item I9 is stored as a value of a gateway to be used in the image forming apparatus 110. In the initial value, the value of item I9 is "N/A", indicating that it has not been set.

The language setting is performed in the language setting screen PIC13.
When the language setting is performed, the value of item I1 is changed to "TRUE", and the value of item I5 becomes information indicating the language selected on the language setting screen PIC13. Further, on the language setting screen PIC13, in a case in which the setting button B13h is depressed, the language setting is performed.

The time setting is performed on the time setting screen PIC14. When the time setting is performed, the value of item I2 is changed to "TRUE." The time input on the time setting screen PIC14 is set to the clock part 124. Further, on the time setting screen PIC14, in a case in which the setting button B14*b* is depressed, the time setting is considered to be performed.

The facsimile setting is performed on the facsimile setting screen PIC15. When the facsimile setting is performed, the value of item I3 is changed to "TRUE", and the value of item I6 is changed to the facsimile number input on the facsimile setting screen PIC15. Further, on the facsimile setting screen PIC15, in a case in which the setting button B15*b* is depressed, the facsimile setting is considered to be performed. The network setting is performed on the network setting screen PIC16. When the network setting is performed, the value of item I4 is changed to "TRUE", and the values of item I7, item I8, and item I9 are changed to the values inputted on the network setting screen PIC16. Further, on the network setting screen PIC16, in a case in which the setting button B16*b* is depressed, the network setting is considered to be performed.

Figure 16:
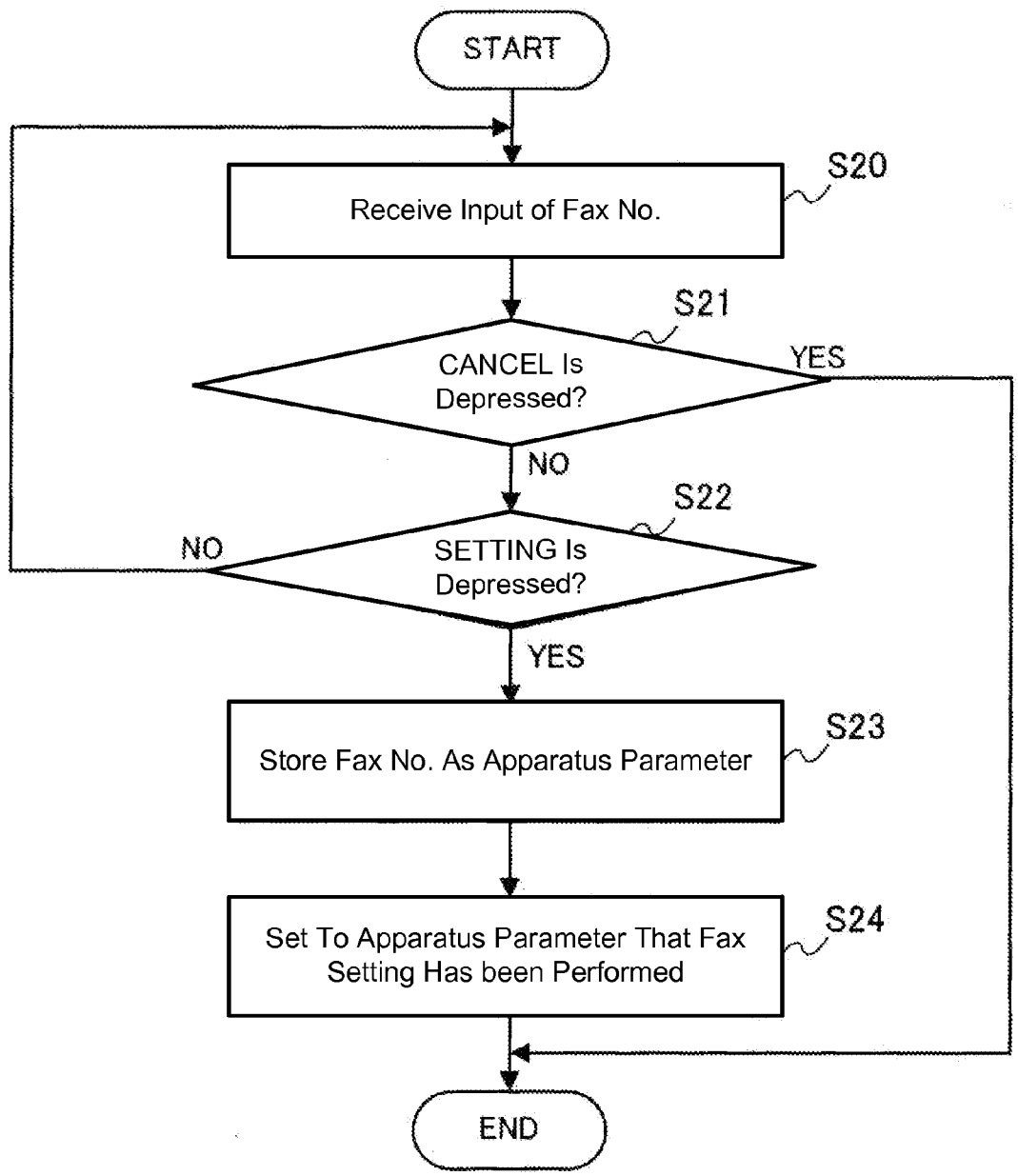
FIG. 16 is a flowchart showing operations when setting a value on a facsimile setting screen according to Embodiment 1.

Next, the operations when setting a value on the setting screen will be explained using the facsimile setting screen PIC15 as an example. FIG. 16 is a flowchart showing the operations when setting a value on the facsimile setting screen PIC15. The flow of FIG. 16 is started in a case in which the facsimile setting button B11*c* is depressed on the apparatus initial setting screen PIC11 shown in FIG. 8. First, the screen control part 121 makes the display input part 115 display the facsimile setting screen PIC15 shown in FIG. 12 and receives an input of the facsimile number (S20). Here, to receive an input of a facsimile number, on the facsimile setting screen PIC15 shown in FIG. 12, the facsimile number input column A15 is highlighted. In this state, when the ten-key 134*b* as shown in FIG. 4 is depressed, the numerical value of the depressed key is displayed on the facsimile number input column A15.

On the facsimile setting screen PIC15, when the cancel button B15*a* is depressed (Yes in S21), the parameter management part 122 does not perform the changes for the apparatus parameter 114, the screen control part 121 terminates the display of the facsimile setting screen PIC15 and returns the screen to the apparatus initial setting screen PIC11. On the facsimile setting screen PIC15, when the setting button B15*b* is depressed (Yes in S22), the parameter management part 122 stores the facsimile number input to the facsimile number input column A15 as a value of item I6 of the apparatus parameter 114 (S23). Furthermore, in order to set to the apparatus parameter 114 that the facsimile setting has already been performed, the parameter management part 122 changes the value of item I3 to "TRUE". Then, the screen control part 121 terminates the facsimile setting screen PIC15 and returns the screen to the apparatus initial setting screen PIC11.

Figure 17:
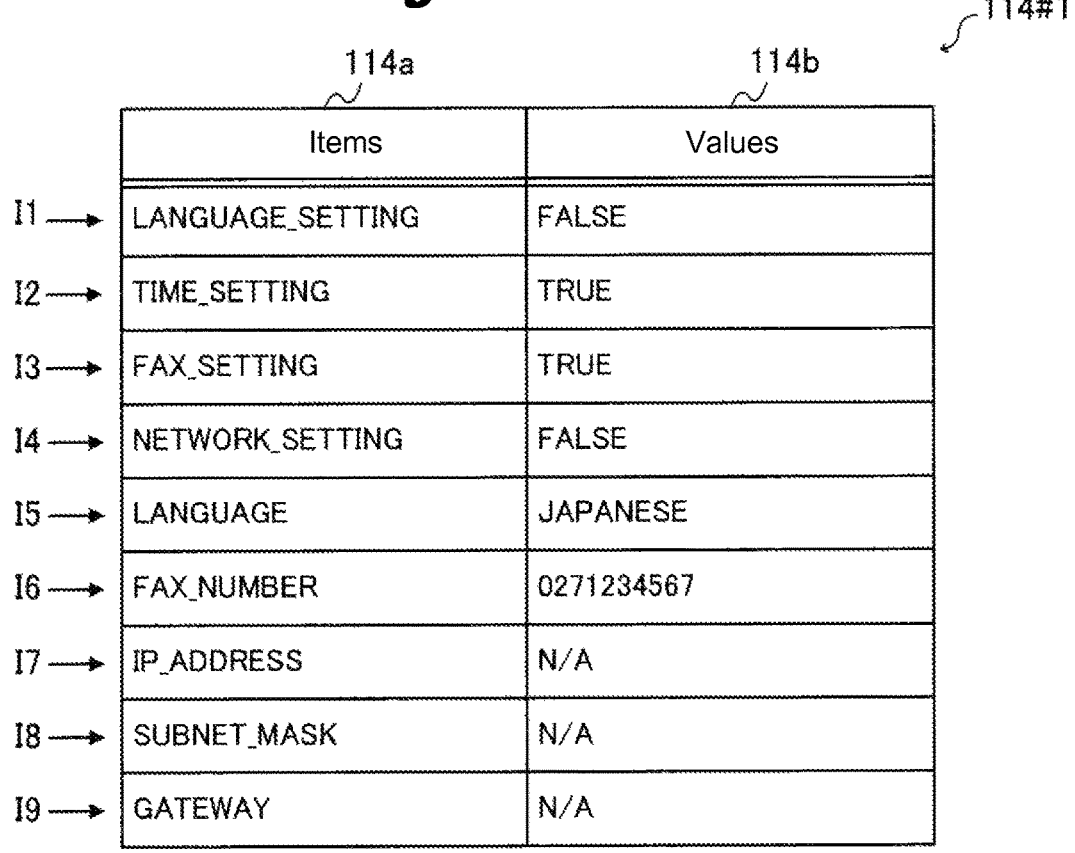
FIG. 17 is a schematic diagram showing an example of device parameters after updating according to Embodiment 1.

FIG. 17 is a schematic diagram showing the apparatus parameter 114#1, in a case in which the apparatus parameter 114 is the initial value, after a facsimile number has been set by the flow as shown in FIG. 16, and the time has been set by the same flow. As shown in FIG. 17, since a facsimile number is set as an initial setting, the value of the item I3 is changed to "TRUE", and the value of item I6 is changed to a facsimile number "0271234567". Also, as shown in FIG. 17, since time is set as the initial setting, the value of item I2 is changed to "TRUE". Further, time that is inputted is reflected on the clock part 124, so it is not stored in the apparatus parameter 114#1. The apparatus parameter 114#1 shown in FIG. 17 shows that the time setting and the facsimile setting have been already performed, but the language setting and the network setting have not been performed.

Figure 18:
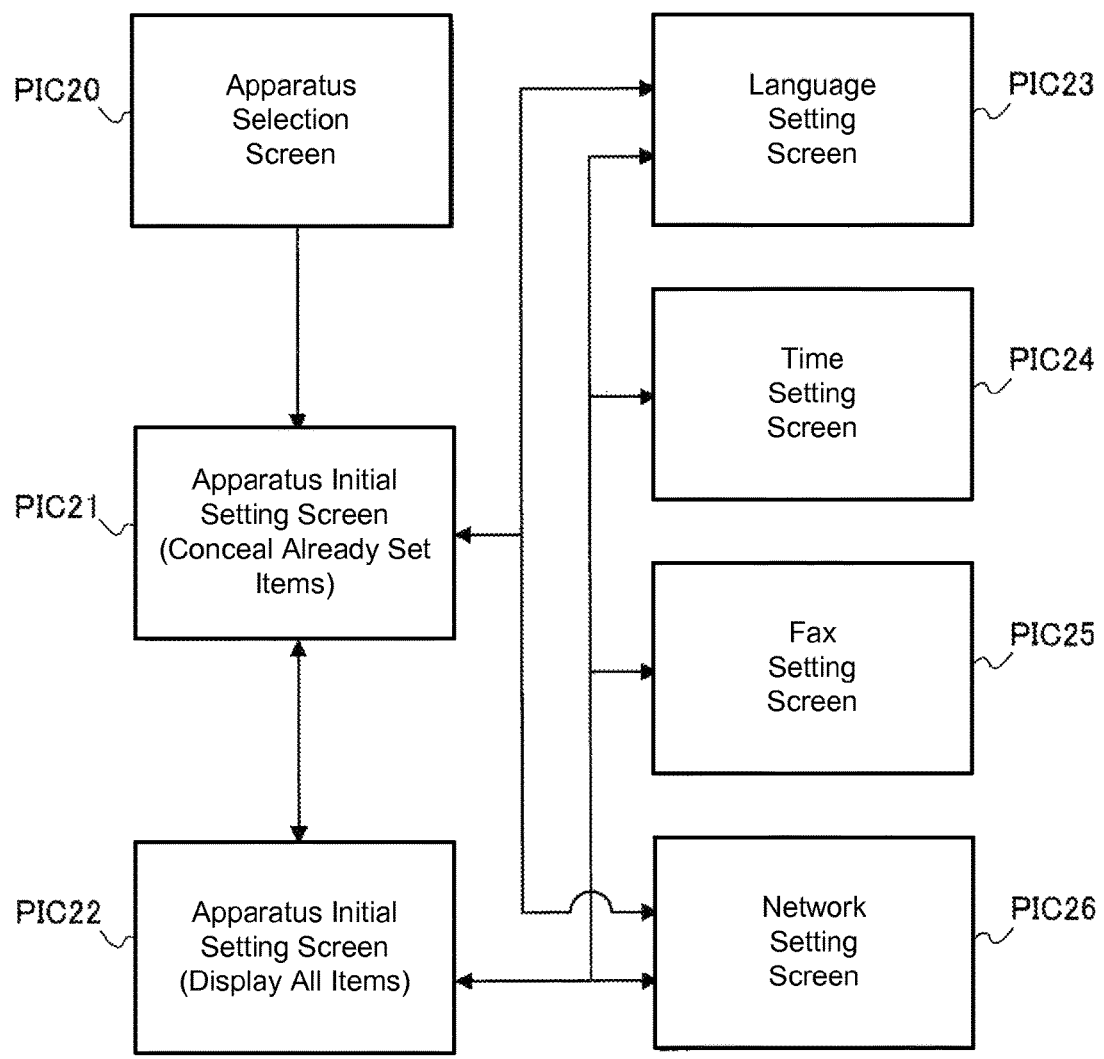
FIG. 18 is a schematic diagram showing a flow of a screen displayed on a display input part of an information processing apparatus according to Embodiment 1.
Figure 19:
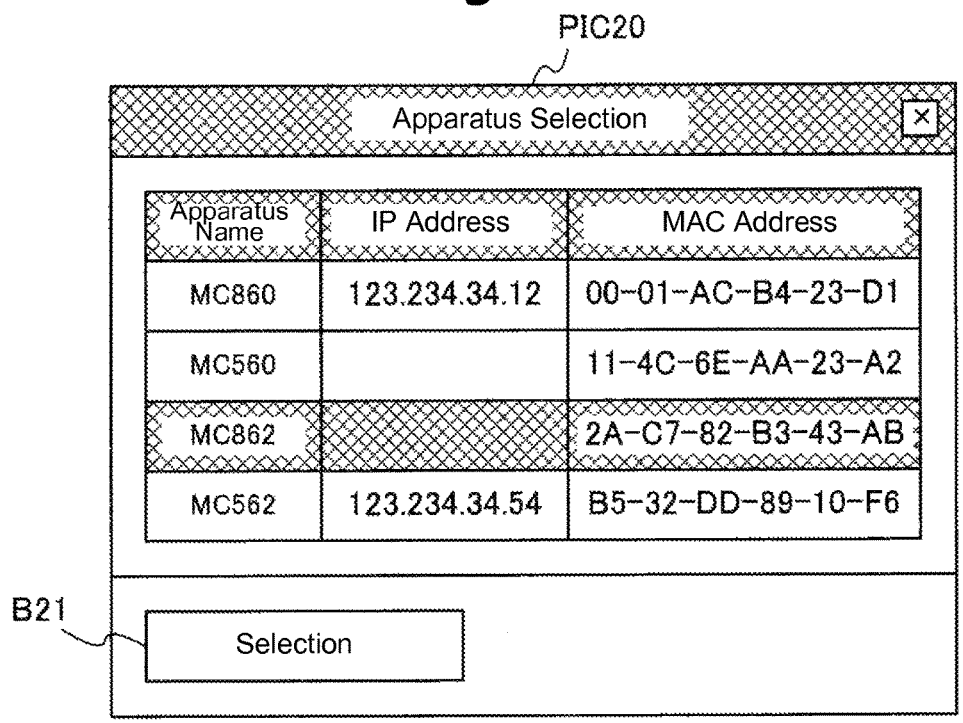
FIG. 19 is a schematic diagram showing an example of an apparatus selection screen according to Embodiment 1.
Figure 20:
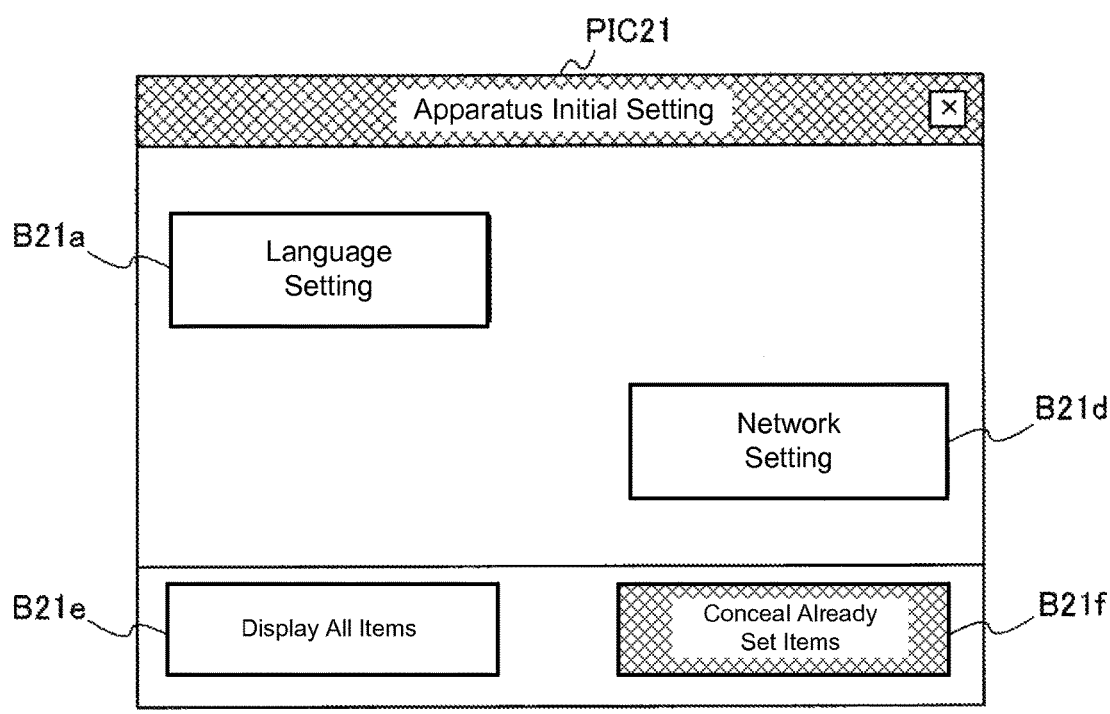
FIG. 20 is a schematic diagram showing an example of an apparatus initial setting screen according to Embodiment 1.
Figure 21:
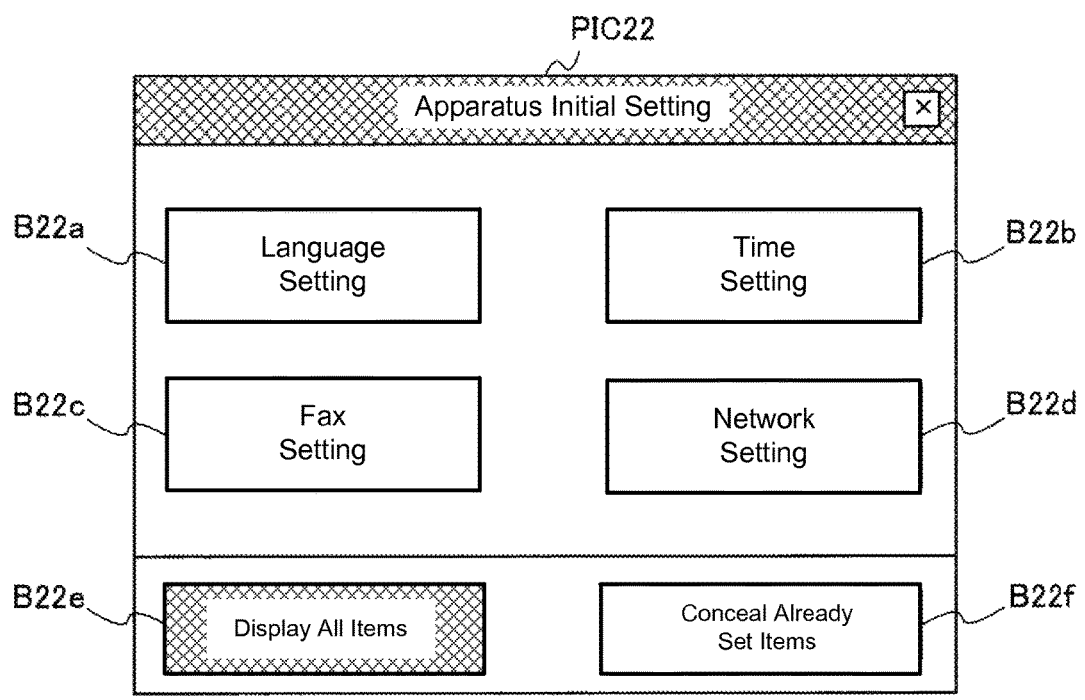
FIG. 21 is a schematic diagram showing an example of an apparatus initial setting screen according to Embodiment 1.

Next, the operations of the initial setting in the information processing apparatus 150 will be explained. FIG. 18 is a schematic diagram showing the flow of the screen displayed on the display input part 155 of the information processing apparatus 150. When the setting tool 161 is started up, the apparatus selection screen PIC20 is displayed on the display input part 155 of the information processing apparatus 150. When the image forming apparatus 110 for performing the initial setting is selected on the apparatus selection screen PIC20, an apparatus initial setting screen PIC21 is displayed, in which it is configured such that an item that has already been set in the selected image forming apparatus 110 cannot be selected. The apparatus initial setting screen PIC21 is a selection screen for selecting an item to perform a setting. Here, on the apparatus initial setting screen PIC21, it is assumed that a language setting and a network setting can be selected. On the initial setting screen PIC21, when an instruction that can select all items is given, an apparatus initial setting screen PIC22 in which all items can be selected is displayed. FIG. 19 is a schematic diagram showing an example of the apparatus selection screen PIC20. FIG. 20 is a schematic diagram showing an example of the apparatus initial setting screen PIC21. FIG. 21 is a schematic diagram showing an example of the apparatus initial setting screen PIC22.

Then, when an item to perform a setting is selected on the apparatus initial setting screen PIC21, a language setting screen PIC23 or a network setting screen PIC26 is displayed on the display input part 155. Also, when an item to perform a setting is selected on the apparatus initial setting screen PIC22, a language setting screen PIC23, a time setting screen PIC24, a facsimile setting screen PIC25, or a network setting screen PIC26 are displayed on the display input part 155. Further, each of the language setting screen PIC23, the time setting screen PIC24, the facsimile setting screen PIC25, and the network setting screen PIC26 is structured approximately in the same manner as the language setting screen PIC13 shown in FIG. 10, the time setting screen PIC14 shown in FIG. 11, the facsimile setting screen PIC15 shown in FIG. 12, and the network setting screen PIC16 shown in FIG. 13. Therefore, the same initial setting as the image forming apparatus 101 can be performed on the information processing apparatus 150. In the following explanation, as a generic term for the language setting screen PIC23, the time setting screen PIC24, the facsimile setting screen PIC25, and the network setting screen PIC26, the term "setting screen for a setting tool" will be used. Further, the operations of each screen in the following description are executed by a setting tool 161. When depicting each screen, the setting tool 161 uses screen data 152.

Figure 22:
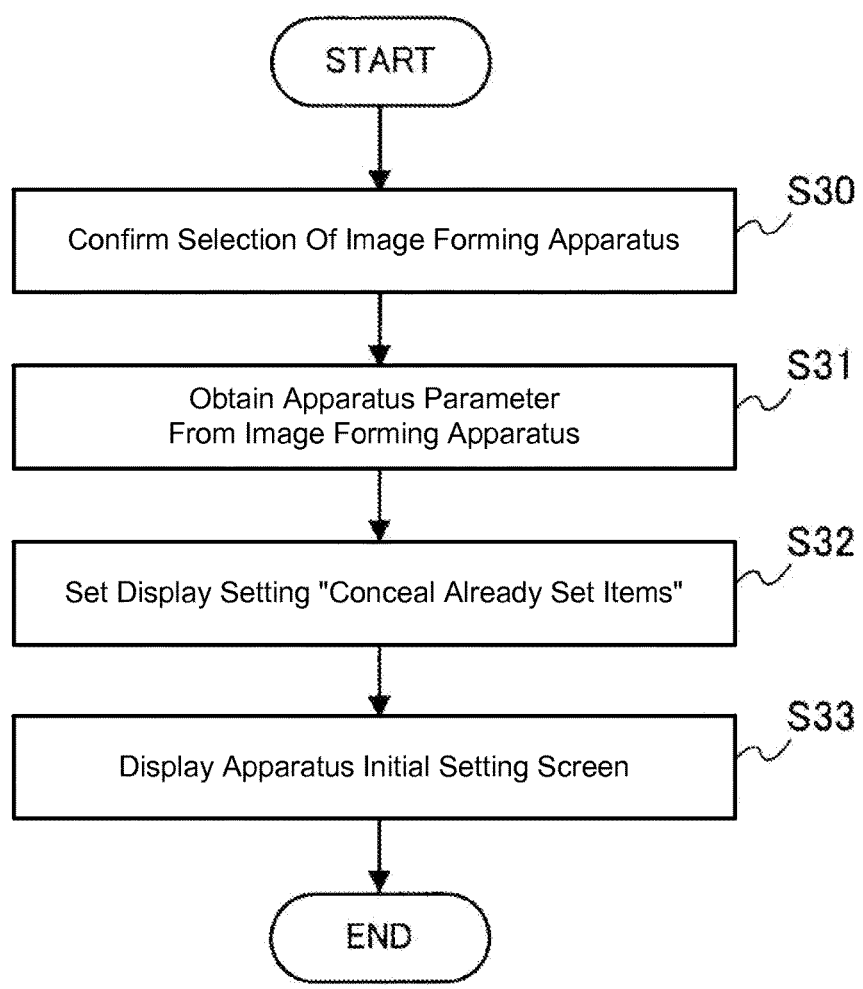
FIG. 22 is a flowchart showing operations of a setting tool at the time of starting according to Embodiment 1.

FIG. 22 is a flowchart showing operations of a setting tool at the time of starting. The flow shown in FIG. 22 is started when the setting tool 161 is started up.

The setting tool 161 searches for the image forming apparatus 110 connected to the network 101 via the communication part 156. Here, it is assumed that the setting tool 161 obtains the apparatus name of the image forming apparatus 110 connected to the network 101, an IP address, and a MAC address. Also, the setting tool 161 makes the display input part 155 display the apparatus selection screen PIC20 shown in FIG. 19. On the apparatus selection screen PIC20, apparatus names, IP addresses, and MAC addresses of the four searched image forming apparatuses 110 are displayed. When any of the displayed apparatus name, IP address, and MAC address is selected, the selected apparatus name, IP address, and the MAC address is highlighted and displayed. Here, it is assumed that the image forming apparatus 110 having the apparatus name "MC862" is highlighted and displayed. In this state, when the selection button B21 is depressed, a selection of the image forming apparatus 110 as a target for the initial setting is confirmed as the image forming apparatus 110 having the apparatus name "MC862" (S30). Further, since a method for searching and selecting the image forming apparatus 110 connected to the network 101 can be realized by a known technology, the detailed explanation will be omitted.

The setting tool 161 obtains the apparatus parameter 114 from the image forming apparatus 110 selected in Step S30 (S31). For example, the setting tool 161, by instructing the communication part 156, transmits the apparatus parameter obtained command as shown in FIG. 23 to the image forming apparatus 110. The apparatus parameter obtaining command is a command (instruction information) requiring the image forming apparatus 110 to obtain a value stored in the apparatus parameter 114, and includes an item requiring to obtain a value. When the image forming apparatus 110 receives such a command, the job control part 123, based on the apparatus parameter 114 stored in the memory part 111, generates an apparatus parameter setting command as shown in FIG. 24. The apparatus parameter setting command is communication information showing a value of a required item. The apparatus parameter setting command is set so that an item which was already set in the image forming apparatus 110 can be identified. The setting tool 161 obtains an apparatus parameter setting command received by the communication part 156. Then, the setting tool 161, by the obtained apparatus parameter setting command, generates an apparatus parameter 154 having a similar structure as the apparatus parameter 114 on the image forming apparatus 110 side and make the memory part 151 store it. The apparatus parameter 154 is setting information which can identify an item in which a setting was already performed in the image forming apparatus 110.

The display setting 153 holds either one of the two values: "Conceal Already Set Items" or "Display All Items" as a display setting of a screen. The setting tool 161 sets a value showing "Conceal Already Set Items" as the initial value of the display setting 153 (S32). The setting tool 161, based on the apparatus parameter 154 and the display setting 153, displays an apparatus initial setting screen PIC21 shown in FIG. 20 (S33). For example, when the apparatus parameter 154 is generated based on the apparatus parameter setting command shown in FIG. 24, since the time setting and the facsimile setting have already been performed, so that they cannot be selected, the apparatus initial setting screen PIC21 shown in FIG. 20 does not display these items. In other words, for the apparatus parameter setting command shown in FIG. 24, since the language setting (LANGUAGE_SETTING) and the network setting (NETWORK_SETTING) have not been performed (FALSE), on the apparatus initial setting screen PIC21 shown in FIG. 20, only the language setting button B21a and the network setting button B21d are shown as buttons for selecting an item for performing an initial setting. The screen, "Conceal Already Set Items," may be referred to a second selection screen, and the screen, "Display All Items," may be referred to a third selection screen in the claims.

On the apparatus initial setting screen PIC21 shown in FIG. 20, when the "display all" button B21e is depressed, the setting tool 161 changes the value of the display setting 153 to a value showing "display all", and makes the display input part 155 display the apparatus initial setting screen PIC22 shown in FIG. 21. The apparatus initial setting screen PIC21 shown in FIG. 20 and the apparatus initial setting screen PIC22 shown in FIG. 21 are screens for having the same role to select an item to perform an initial setting on the image forming apparatus 110, and only the content of the display is changed. On the apparatus initial setting screen PIC22 shown in FIG. 21, a language setting button B22a and a network setting button B22d similar to the apparatus initial setting screen PIC21 shown in FIG. 20 are displayed, and also a time setting button B22b and a facsimile setting button B22c hidden on the apparatus initial setting screen PIC21 are displayed.

Figure 25:
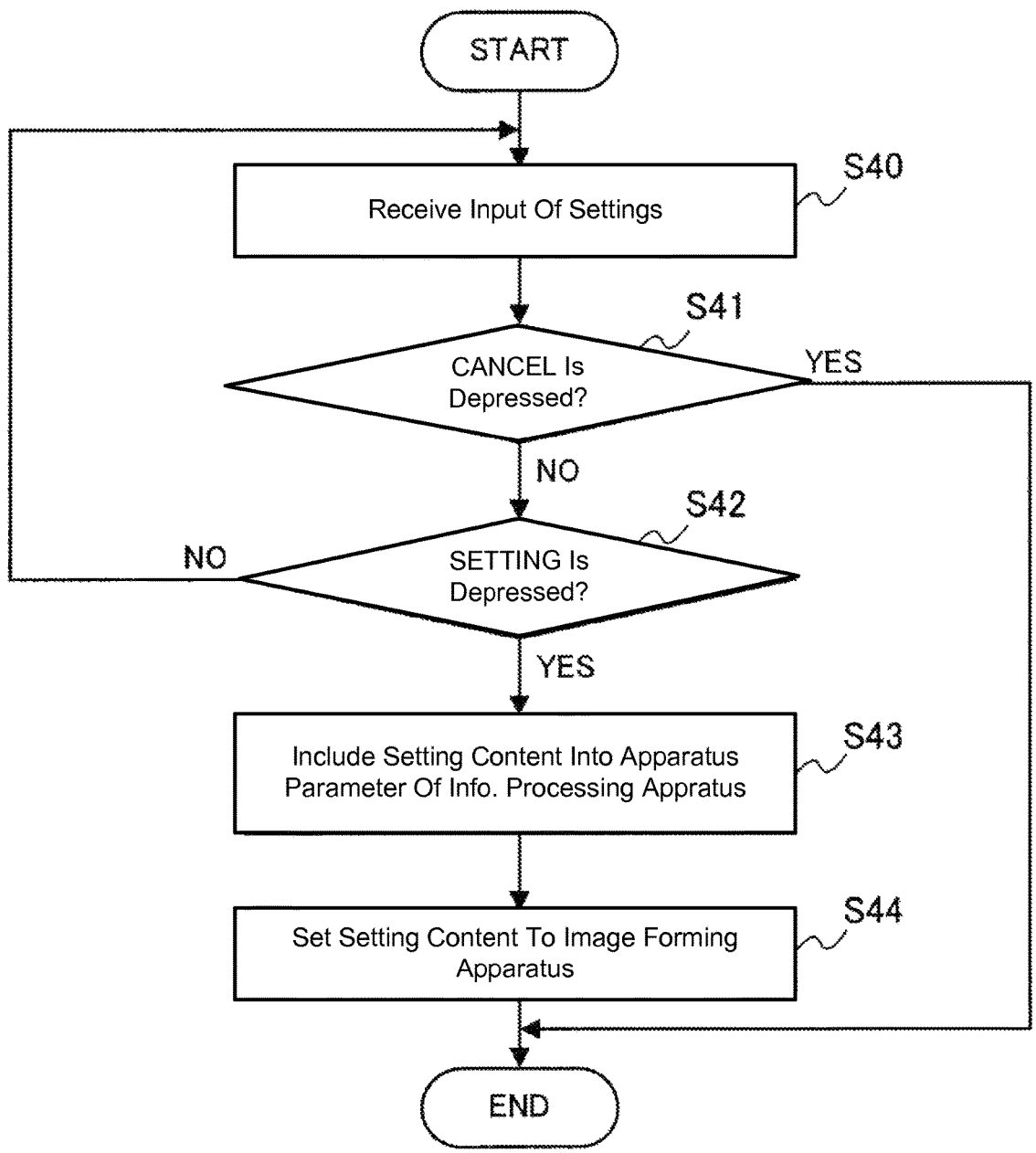
FIG. 25 is a flowchart showing operations of a "setting screen for a setting tool" according to Embodiment 1.

FIG. 25 is a flowchart showing operations of the "setting screen for a setting tool". The operations of the "setting screen for a setting tool" will be explained using the language setting screen PIC23 shown in FIG. 26 as an example. The flowchart shown in FIG. 25 is started in a case in which the language setting button B21a is depressed on the apparatus initial setting screen PIC21 shown in FIG. 20.

Figure 26:
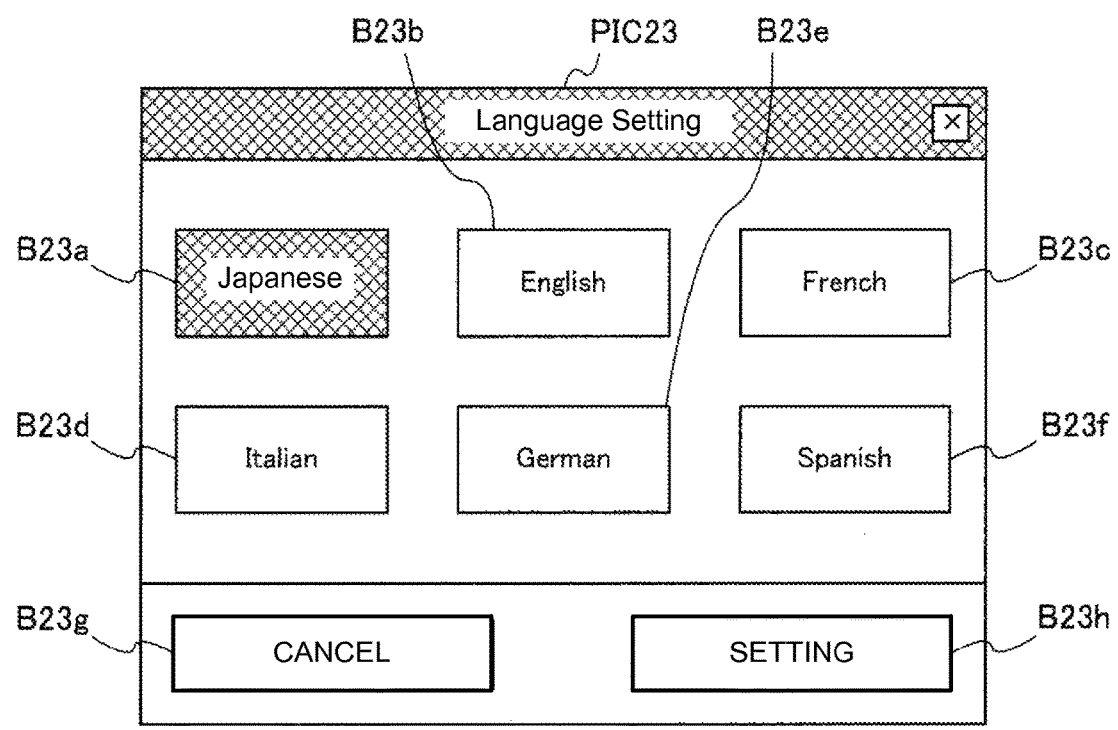
FIG. 26 is a schematic diagram showing an example of a language setting screen according to Embodiment 1.

The setting tool 161 displays a language setting screen PIC23 as shown in FIG. 26 on the display input part 155. The language setting screen PIC23 includes language selection buttons B23a-B23f, a cancel button B23g, and a setting button B23h. These buttons are similar to the language setting screen PIC13 of the image forming apparatus 110 shown in FIG. 10. Further, the setting tool 161 receives a push of a button (or input of settings) corresponding to the language to be selected among the language selection button B23a-B23f (S40). In FIG. 26, the language selection button B23a for Japanese is selected, and the button is highlighted and displayed. Here, when a language selection button B23b-B23f of another language is depressed, the depressed button is exclusively highlighted and displayed. In other words, among the language selection buttons B23a to B23f, only one button will be highlighted and displayed.

On the language setting screen PIC23, when the cancel button B23g is depressed (Yes in Step S41), the setting tool 161 terminates the language setting screen PIC23 without performing the changes to the apparatus parameter 154 and makes the display input part 155 display the apparatus initial setting screen PIC21 shown in FIG. 20.

On the language setting screen PIC23, when the setting button B23h is depressed (Yes in Step S42), the setting tool 161 sets the highlighted and displayed language as the apparatus parameter 164 (S43). Putting it in another way, the setting content is written into the apparatus parameter in the information processing apparatus. For example, on the language setting screen PIC23, in a case in which the language selection button B23b for "English" is highlighted and displayed, the setting tool 161 changes the value of item I15 of "LANGUAGE" of the apparatus parameter 154 is changed to "ENGLISH" and changes the value of item I11 of "LANGUAGE_SETTING" to "TRUE".

Next, the setting tool 161 sets the content set for the apparatus parameter 154 to the image forming apparatus 110 (S44). For example, the setting tool 161 generates an apparatus parameter updating command shown in FIG. 28. Then, the setting tool 161 instructs the communication part 156 to transmit the apparatus parameter update command to the image forming apparatus 110. The apparatus parameter update command is update instruction information showing an item updated by the information processing apparatus 150 and the updated value. In the image forming apparatus 110 that received such a command, such command is given to the parameter management part 122. Further, in the apparatus parameter 114, the parameter management part 122 sets the value of an updated item shown by a command to the updated value. In addition, in a case in which an initial setting of a network is performed on the information processing apparatus 150, an apparatus parameter update command as shown in FIG. 29 is transmitted to the image forming apparatus 110.

Further, when the process of Step S44 is completed, the processing for the language setting is completed, and the apparatus initial setting screen is displayed on the display input part 155. In the apparatus initial setting screen displayed here, as shown in FIG. 20, the language setting button B21a that has been already set can be displayed, or the language setting button B21a that has been already set can be hidden.

It also can be configured such that the language setting button B21a that has been already set is displayed, but the display is made in such a manner that it has already been set. For example, the language setting button B21a can be displayed with dotted lines, or a mark, etc., indicating that it has already been set may be displayed within the language setting button B21a or on the periphery of the language setting button B21a. Further, it can be configured such that the language setting button B21a which has already been set is displayed, but the button cannot be selected by blackout, etc.

As described above, according to Embodiment 1, in the image forming system 100 capable of performing an initial setting of the image forming apparatus 110 from a plurality of display input parts, for a setting item which has already been set, since a selection to set such an item cannot be performed, unintended overwriting can be prevented. Furthermore, since an item set to be unable for selection can be made so as to be selectable, a freedom for a user to select a display input part can also be secured.

According to the embodiment as described above, as in the apparatus initial setting screen PIC21 shown in FIG. 20, a setting item which has already been set is non-displayable, but it is not limited to that. For example, it can be configured such that for a setting item that has already been set, it is displayed but non-selectable by a blackout, etc.

According to the embodiment as described above, as in the apparatus initial setting screen PIC22 shown in FIG. 21, in a case in which all setting items are instructed to be displayed, all setting items are displayed. At this time, for a setting item which has already been set, it can be displayed to show that it has been selected.

According to the embodiment as described above, it is possible to manage an apparatus in which an initial setting has been performed. For example, as shown in FIG. 30, the parameter management part 122 of the image forming apparatus 110 adds the apparatus name column 114c to the apparatus parameter 114 stored in the memory part 111, and stores the apparatus identification information (here, the apparatus name) which can identify the apparatus in which the setting of the value has been performed.

Then, by adding the apparatus identification information in which a value is set to the apparatus parameter setting command shown in FIG. 24, a notification is made to the information processing apparatus 150. With this, the setting tool 161 of the information processing apparatus 150 can set the apparatus initial setting screen PIC21 shown in FIG. 20 so that a setting item in which a value has been set by an apparatus other than the apparatus itself cannot be selected. Further, the apparatus identification information is also added to the apparatus parameter update command. By doing so, the information processing apparatus 150 cannot select and set a setting item that has already been set by a display input part of another apparatus. For example, in a case in which a display input part is assigned per user, etc., a setting item set by another person cannot be changed, but a setting item set by itself can be changed even if it has already been set. Further, in such a case, for example, the apparatus name of the apparatus is included in the apparatus parameter update command shown in FIG. 28 and FIG. 29.

According to the embodiment as described above, a multifunction machine was used as an example of the image forming apparatus 110, but it is not limited to that, and the image forming apparatus 110 of this embodiment can be a printer, a copy machine, or a facsimile machine.

Also, according to the embodiment as described above, the network 101 is used as a connection means of the image forming apparatus 110 and the information processing apparatus 150, but it is not limited to that. For example, the image forming apparatus 110 and the information processing apparatus 150 may be directly connected using a USB (Universal Serial Bus). Further, the image forming apparatus 110 and the information processing apparatus 150 can directly transmit and receive data using wireless communication such as Bluetooth, etc.

Through the above embodiment(s), display input part 115 is the first display input part, display input part 155 is the second display input part. A selection screen that is displayed in the first display input part is referred to a first selection screen. Another selection screen that is displayed in the second display input part is referred to a second selection screen.

What is claimed is:

1. An image forming system, comprising:
an image forming apparatus; and
an information processing apparatus connected to the image forming apparatus via a network, wherein
the image forming apparatus comprises:
a first control part that causes a first selection screen to be displayed that includes a first setting item and a second setting item for setting the image forming apparatus;
a memory part that stores setting information that specifies whether or not the first setting item and the second setting item have been set; and
a first communication part for communicating with the information processing apparatus,
based on the setting information, the first control part generates communication information that identifies a setting item that has been set,
the information processing apparatus comprises:
a second communication part for communicating with the first communication part of the image forming apparatus; and
a second control part that controls display for setting the image forming apparatus,
the second communication part obtains the communication information through the first communication part,
when the communication information obtained through the first communication part indicates that the first setting item has been set in the image forming apparatus and that the second setting item has not been set in the image forming apparatus, the second control part causes a second selection screen to be displayed that includes the second setting item and a screen that indicates that the first setting item has been set.

2. The image forming system according to claim 1, wherein,
the second selection screen further includes a region for receiving a display instruction for a third selection screen that includes the first setting item and the second setting item.

3. The image forming system according to claim 2, wherein
in the third selection screen, the first setting item is displayed distinguishably from the second setting item.

4. The image forming system according to claim 1, wherein
the first control part controls to display a home screen when the first setting item has been set.

5. The image forming system according to claim 1, wherein
the first selection screen is an initial setting screen that is displayed when the image forming apparatus is started.

6. The image forming system according to claim 1, wherein
the image forming apparatus stores predetermined initial values that correspond to the first setting item and the setting item to a memory region of the memory part that stores the setting information when the setting information for the first setting item and the second setting item has not been stored in the memory part.

7. The image forming system according to claim 6, wherein
the first control part controls to display a home screen when the setting information is changed from the initial values, and
the first control part controls to display the first setting screen when the setting information has not been changed from the initial values, the first setting screen being an initial setting screen.

8. The image forming system according to claim 1, wherein
the screen that indicates that the first setting item has been set presents the indication by not displaying the first setting item.

9. The image forming system according to claim 1, wherein
the setting item has been set are a setting item that has been changed from an initial setting.

* * * * *